(12) United States Patent
Brown et al.

(10) Patent No.: US 6,285,966 B1
(45) Date of Patent: Sep. 4, 2001

(54) FUNCTION BLOCK APPARATUS FOR VIEWING DATA IN A PROCESS CONTROL SYSTEM

(75) Inventors: Larry K. Brown; Brent H. Larson; Harry A. Burns, all of Marshalltown, IA (US)

(73) Assignee: Fisher Controls International, Inc., Clayton, MO (US)

( * ) Notice: Subject to any disclaimer, the term of this patent is extended or adjusted under 35 U.S.C. 154(b) by 0 days.

(21) Appl. No.: 09/105,333

(22) Filed: Jun. 25, 1998

(51) Int. Cl.[7] .................................................. G06F 15/00
(52) U.S. Cl. .............................................. 702/188; 702/182
(58) Field of Search .................................. 702/182, 188, 702/122; 340/870.11; 709/103

(56) References Cited

U.S. PATENT DOCUMENTS

| | | | |
|---|---|---|---|
| 5,542,047 | 7/1996 | Armstrong | 395/200.11 |
| 5,706,455 | 1/1998 | Benton et al. | 395/348 |
| 5,970,430 | * 10/1999 | Burns et al. | 702/122 |
| 6,026,352 | * 2/2000 | Burns et al. | 702/182 |

FOREIGN PATENT DOCUMENTS

| | | |
|---|---|---|
| 0 575 150 A2 | 12/1993 | (EP) . |
| 0 604 091 A2 (A3) | 6/1994 | (EP) . |
| WO 98/14848 | 4/1998 | (WO) . |
| WO 98/14852 | 4/1998 | (WO) . |

OTHER PUBLICATIONS

PCT Written Opinion for PCT/US99/06409, dated Feb. 25, 2000.

* cited by examiner

*Primary Examiner*—Kamini Shah
(74) *Attorney, Agent, or Firm*—Marshall, O'Toole Gerstein, Murray & Borun

(57) ABSTRACT

The present invention is directed to a method of and a device for monitoring, from a central location, the current operating conditions (such as values of process parameters) in a process control network having distributed control functions. In one embodiment, the method and device of the present invention use scheduled periodic communications to send signals containing, for example, measured values of process parameters developed by field devices to a centralized viewing device. The viewing device receives the signals and stores at least one value of the process parameters, and maybe more values if necessary to monitor and control the process. To retrieve the stored process parameters for viewing, the viewing device processes messages from human interface devices requesting the stored values of one or more of the stored parameters and then transmits response messages containing the stored values. The human interface device may be the same device as the viewing device, or may be a separate device that communicates with the viewing device using either the same or a different communication protocol as that used by the field devices to communicate with the viewing device. Additionally, the request and response messages may be sent between the devices using unscheduled queued communications.

44 Claims, 7 Drawing Sheets

FUNCTION BLOCK APPARATUS FOR VIEWING DATA IN A PROCESS CONTROL SYSTEM

FIELD OF THE INVENTION

The present invention relates generally to process control networks and, more specifically, to a method of and to an apparatus for viewing data in a process control network having distributed control functions.

DESCRIPTION OF THE RELATED ART

Large processes such as chemical, petroleum, and other manufacturing and refining processes include numerous field devices disposed at various locations to measure and control parameters of the process to thereby effect control of the process. These field devices may be, for example, sensors such as temperature, pressure, and flow rate sensors as well as control elements such as valves and switches.

Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of devices within the process to thereby control process parameters according to some overall control scheme. Usually, however, the control scheme implemented by a DCS is proprietary to the DCS controller manufacturer which, in turn, makes the DCS difficult and expensive to expand, upgrade, reprogram, and service because the DCS provider must become involved in an integral way to perform any of these activities. Furthermore, the equipment that can be used by or connected within any particular DCS may be limited due to the proprietary nature of DCS controller and the fact that a DCS controller provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, LONWORKS®, Device-Net®, and CAN protocols, which enable field devices made by different manufacturers to be used together within the same process control network. In fact, any field device that conforms to one of these protocols can be used within a process to communicate with and to be controlled by a DCS controller or other controller that supports the protocol, even if that field device is made by a different manufacturer than the manufacturer of the DCS controller.

Moreover, there is now a move within the process control industry to decentralize process control and, thereby, simplify DCS controllers or eliminate the need for DCS controllers to a large extent. Decentralized control is obtained by having process control devices, such as valve positioners, transmitters, etc. perform one or more process control functions and by then communicating data across a bus structure for use by other process control devices in performing other control functions. To implement these control functions, each process control device includes a microprocessor capable of performing one or more control functions as well as communicating with other process control devices using a standard and open communication protocol. In this manner, field devices made by different manufacturers can be interconnected within a process control network to communicate with one another and to perform one or more process control functions forming a control loop without the intervention of a DCS controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process.

As noted above, the decentralization of process control functions simplifies and, in some cases, eliminates the necessity of a proprietary DCS controller which, in turn, reduces the need of a process operator to rely on the manufacturer of the DCS controller to change or upgrade a control scheme implemented by the DCS controller. However, decentralized control also makes it more difficult to compile and view real time values of process parameters at a central location for the field devices. Thus, although the processing control functions of the process operator are reduced or simplified in this decentralized control scheme, it is still desirable to monitor the current operating conditions in the process control network at a central or single location.

In a standard DCS environment and in many distributed control environments, real time information is accumulated by a host device by making information requests to the field devices. When the process operator wants to view the current value of one or more process parameters, the host device creates request messages for the field devices that store the parameters selected by the operator. The request messages are transmitted from the host device on the bus to the field devices. Upon receiving the request messages, the field devices create response messages that are transmitted back to the host device on the bus. Accordingly, each transfer of process parameters from a field device to a host device involves two bus transactions: an information request message and a response message.

In many instances, the process control parameters requested from the field devices by the host are parameters that are otherwise transmitted from one field device to another field device using a separate bus transaction. In each of these instances, three separate bus transactions related to the same information are transmitted along the bus. Additionally, the host monitors information from many field devices so that a large volume of bus traffic is generated by the monitoring operation. The large amount of bus traffic resulting from the monitoring operation can reduce the communication throughput of other important communication operations, possibly reducing the overall responsiveness of the process control network.

A bus monitor is one type of known device that accumulates data without necessitating additional bus traffic in a DCS environment. Bus monitors have no capability to talk or issue requests on the bus, but they constantly listen to the bus and capture all bus transactions that are generated on the bus segment to which they are attached. Presently known bus monitors are designed to monitor the bus traffic and to evaluate the performance of the communication protocol and the bus network. The bus monitors are not intended to be used to monitor process data and, therefore, have only limited capabilities to filter, sort and store process data. For example, a bus monitor may be configured to filter and store all messages of a particular protocol message type, such as all request messages or all response messages, but the monitor cannot extract, store or manipulate the process data contained within the filtered messages. In order to view particular process data, a separate device is required to extract, sort and manipulate the information stored in the bus monitor. Therefore, the bus monitors as presently implemented in DCS environments do not readily provide access to the current operating conditions in the process-control network.

SUMMARY OF THE INVENTION

The present invention is directed to a method of and a device for monitoring, from a central location, the current operating conditions (such as values of process parameters) in a process control network having distributed control functions. In one embodiment, the method and device of the present invention use scheduled periodic communications to send signals containing, for example, measured values of process parameters developed by field devices to a centralized viewing device. The viewing device receives the signals and stores at least one value of the process parameters, and maybe more values, if necessary, to monitor and control the process. To retrieve the stored process parameters for viewing, the viewing device processes messages from human interface devices requesting the stored values of one or more of the stored parameters and then transmits response messages containing the stored values. The human interface device may be the same device as the viewing device, or may be a separate device that communicates with the viewing device using either the same or a different communication protocol as that used by the field devices to communicate with the viewing device. Additionally, the request and response messages may be sent between the devices using unscheduled queued communications.

By using scheduled periodic communications to accumulate real time values of process parameters, the method and device of the present invention are able to store real time values of process parameters without the necessity of sending separate request and response messages between the viewing device and the field devices, thereby reducing communication traffic in the network. Process parameters that are typically transmitted between devices on the bus may be monitored without creating any additional bus traffic by defining the viewing device as an additional recipient of a message containing a monitored process parameter. Moreover, all field devices transmit information to the viewing device in the same manner, thus simplifying the process of accumulating the real time values of the process parameters.

In an alternative embodiment, the method and device of the present invention use a centralized viewing device to capture all the transactions on the bus, to identify messages containing process data, and to accumulate values of monitored process parameters developed by field devices. The viewing device receives the transactions transmitted on the bus and filters out process data necessary to monitor and control the process, particularly one or more process parameters that the viewing device is configured to monitor. To retrieve the stored process parameters for viewing, the viewing device includes a human interface that allows a user to request the stored values of one or more of the stored parameters for display at the human interface. By capturing information that is already transmitted on the bus, the method and device of the present invention are able to store real time values of process parameters without the necessity of sending request and response messages between the viewing device and the field devices, thereby reducing communication traffic in the network.

According to one aspect of the present invention, a method of viewing real time process information is implemented in a process control network having a plurality of devices communicatively linked on a bus. At least one of the devices includes a viewing process function module that is configured for storage and retrieval of values of process parameters, but does not use the values to perform process control. The values are retrieved from the viewing process function module in response to a request generated by a user selecting one or more process parameters from a plurality of selectable process parameters. The method includes the steps of configuring the viewing process function module to store one or more values of one or more process parameters, communicatively linking outputs of process function modules associated with the process parameters to an input of the viewing process function module, transmitting values of the process parameters from the process function modules to the viewing process function module using scheduled periodic communications, and storing the transmitted values of the process parameters in the viewing process function module.

The viewing process function module may be one of a plurality of process function modules to which the values of the process parameters are transmitted by the second process function module. Additionally, the viewing process function module may be a viewing function block in the Fieldbus protocol.

Moreover, the process control network may include a human interface for retrieving and displaying the values stored in the viewing process function module. In this case, the method includes connecting a display device having an output process function module with a human interface to the bus, and communicatively linking the output process function module to the viewing process function module. The method further includes transmitting requests for one or more values of one or more process parameters from the output process function modules to the viewing process function module, transmitting responses with the requested values of the process parameters from the viewing process function module to the output process function module, and displaying the requested values at the human interface. The display device and the device with the viewing process function module may be connected to a second bus of a second process control network, thereby permitting a user of the second network to view real time process information of the first network.

According to another aspect of the present invention, an information viewing system is provided for use in viewing real time values of process parameters in a process control network having a plurality of devices communicatively linked over a bus, wherein each of the devices is capable of performing a process function and of communicating on the bus using scheduled periodic communications. The information viewing system includes a first signal generator that generates input signals including values of process parameters associated with the first device, a first communicator that is coupled to the signal generator and configured to deliver the input signals to an input of a second device using scheduled periodic communications, a data capture unit disposed in the second device that receives the input signals, and a storage unit disposed in the second device that is communicatively linked to the data capture unit. The storage unit is adapted to store one or more values of one or more process parameters.

The information viewing system further includes a second signal generator disposed in one of the devices that generates request signals for at least one stored value of one or more of the process parameters, and a second communicator coupled to the second signal generator that is configured to deliver the request signals to an input of the second device using the unscheduled quened communications, with the request signals being received by the data capture unit. Additionally, the information viewing system includes a data transfer unit disposed in the second device that generates response signals with the requested values of the process parameters from the storage unit, and a third communicator coupled to the data transfer unit that is configured to deliver the response signals to an input of the third device using the unscheduled queued communications. Moreover, the information viewing system includes a second signal receiver that receives the response signals, and a display device disposed in one of the devices that displays the values of the process parameters at a human interface.

The data transfer unit of the information viewing system may be adapted to receive the values of the process parameters, to cause the storage unit to overwrite or append stored values of the process parameters with the value from the input signal, and to configure the storage unit to store one or more process parameters and information associated with the process parameters. The information viewing system may also be configured such that a plurality of input signals are generated by a plurality of devices, with the data capture unit, the data transfer unit, and the storage unit configured to receive and process each of the input signals.

According to a still further aspect of the present invention, a viewing process function module, that may be a function block in a Fieldbus protocol, that is capable of being implemented in a process control device is provided in a process control network having a plurality of devices that are communicatively coupled to a bus and capable of communicating on the bus using scheduled periodic communications. The viewing process function module includes a data capture unit that receives input signals from one or more process function modules that contain values of process parameters associated with the process function modules. The viewing process function module further includes a storage unit configured to store at least one value of one or more process parameters, and a data transfer unit that overwrites or appends the values of the process parameters in the storage unit with the values of the process parameters from the input signals.

Moreover, the viewing process function module may include an output host interface that receives request signals generated by a user requesting values of one or more process parameters from a plurality of selectable process parameters. The requests are transmitted using unscheduled queued communications and the output host interface transfers the requests to the data transfer unit. The data transfer unit retrieves the requested values of the process parameters from the storage unit and the output host interface generates a response with the requested values that is transmitted to the requesting device.

According to yet another aspect of the present invention, a method of viewing real time process information is implemented in a process control network having a plurality of devices communicatively linked on a bus. One of the devices is a viewing bus monitor that is configured for storage and retrieval of values of process parameters. The viewing bus monitor obtains the values by filtering process data out of transactions on the bus. The values stored in the viewing bus monitor are retrieved in response to requests generated by a user selecting one or more process parameters from a plurality of selectable process parameters. The method includes the steps of configuring the viewing bus monitor to store one or more values of one or more process parameters, transmitting process data messages containing values of the process parameters on the bus, capturing transactions on the bus at the viewing bus monitor, identifying the process data messages containing values of the process parameters stored by the viewing bus monitor, and storing the values of the process parameters in the storage unit.

Moreover, the viewing bus monitor may further include an internal or external human interface. When a human interface is provided, the method may further include the steps of entering a request for one or more stored values of the process parameters at the human interface, retrieving the requested values from the storage unit, and displaying the requested process parameters at the human interface.

According to another aspect of the present invention, an information viewing system is provided for use in viewing real time values of process parameters in a process control network having a plurality of devices communicatively linked over a bus, wherein each of the devices is capable of performing a process function and of communicating on the bus. The information viewing system includes a signal generator that generates process data messages including values of one or more process parameters, a first communicator coupled to the signal generator and configured to transmit the process data messages on the bus, a data capture unit disposed in a viewing bus monitor that receives the process data messages, and a storage unit disposed in the viewing bus monitor and communicatively linked to the data capture unit. The viewing bus monitor is adapted to capture all transactions on the bus and the data capture unit is adapted to identify the process data messages. The storage unit is configured to store one or more values of one or more process parameters.

The information viewing system may include a data transfer unit adapted to receive the values of the process parameters, to cause the storage unit to overwrite or append stored values of the process parameters with the values from process data messages, and to configure the storage unit to store one or more process parameters and information associated with the process parameters. The information viewing system may also be configured such that a plurality of process data messages are generated by a plurality of devices, with the data capture unit, the data transfer unit, and the storage unit configured to receive and process each of the process data messages. Moreover, the information viewing system includes a human interface that generates requests for one or more stored values of the process parameters and displays the stored values of the process parameter(s).

According to a still further aspect of the present invention, a viewing bus monitor capable of being implemented in a process control network having a plurality of devices communicatively coupled to a bus includes a data capture unit that captures bus transactions and identifies process data messages containing values of process parameters, a storage unit that stores at least one value of at least one process parameter, and a data transfer unit that overwrites or appends the stored values of the process parameters in the storage unit with the value of the process parameter from the process data message. The viewing bus monitor may be capable of receiving a plurality of process data messages, each of which is generated by a field device and transmitted on the bus, and contains values of a plurality of process parameters. The viewing bus monitor may also be capable of storing one or more value of each of a plurality of process parameters in the storage unit.

The features and advantages of the invention will be apparent to those of ordinary skill in the art in view of the detailed description of the preferred embodiment, which is made with reference to the drawings, a brief description of which is provided below.

DESCRIPTION OF THE PREFERRED EMBODIMENTS

Figure 1:
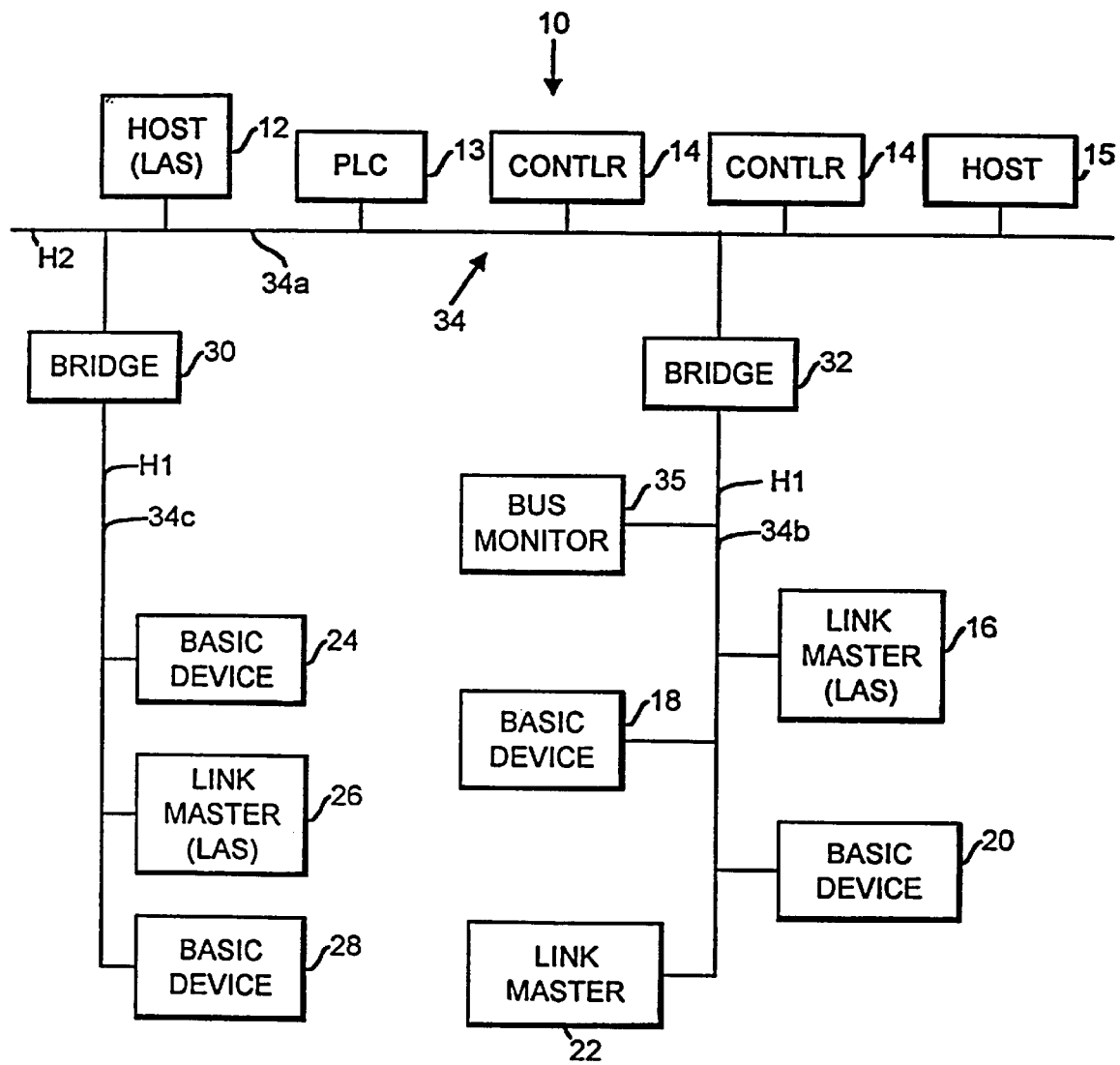
FIG. 1 is a schematic block diagram of a process control network using the Fieldbus protocol.

While the viewing devices of the present invention are described in detail in conjunction with a process control network that implements process control functions in a decentralized or distributed manner using a set of Fieldbus devices, it should be noted that the viewing devices of the present invention can be used with process control networks that perform distributed control functions using other types of field devices and communication protocols, including protocols that rely on other than two-wire buses and protocols that support only analog or both analog and digital communications. Thus, for example, the viewing devices of the present invention can be used in any process control network that performs distributed control functions even if this process control network uses the HART, PROFIBUS, etc. communication protocols or any other communication protocols that now exist or that may be developed in the future. Furthermore, the viewing devices of the present invention may also be used with standard process control networks that do not perform distributed control functions, such as HART networks, etc., and may be used with any desired process control device, including valves, positioners, transmitters, etc.

Before discussing the details of the viewing devices of the present invention, a general description of the Fieldbus protocol, field devices configured according to this protocol, and the way in which communication occurs in a process control network that uses the Fieldbus protocol will be provided. However, it should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Texas. In particular,the Fieldbus protocol, and the manner of communicating with and storing data in devices using the Fieldbus protocol, is described in detail in the manuals entitled Communications Technical Specification and User Layer Technical Specification from the Fieldbus Foundation, which are hereby expressly incorporated by reference herein in their entirety.

The Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process facility, which enables these field devices to perform control functions at locations distributed throughout a process and to communicate with one another before and after the performance of these control functions to implement an overall control strategy. Because the Fieldbus protocol enables control functions to be distributed throughout a process control network, it reduces the complexity of, or entirely eliminates the necessity of the centralized process controller typically associated with a DCS.

Referring to FIG. 1, a process control network 10 using the Fieldbus protocol may include a host 12 connected to a number of other devices such as a program logic controller (PLC) 13, a number of controllers 14, another host device 15 and a set of field devices 16, 18, 20, 22, 24, 26, 28, 30, and 32 via a two-wire Fieldbus loop or bus 34. The network 10 may further include other devices, such as a bus monitor 35, that constantly listen to the bus 34 and accumulate communications and diagnostics information that is used to evaluate the performance of the network 10. The bus 34 includes different sections or segments, 34a, 34b, and 34c which are separated by bridge devices 30 and 32. Each of the sections 34a, 34b, and 34c interconnects a subset of the devices attached to the bus 34 to enable communications between the devices in a manner described hereinafter. Of course, the network of FIG. 1 is illustrative only, there being many other ways in which a process control network may be configured using the Fieldbus protocol. Typically, a configure is located in one of the devices, such as the host 12, and is responsible for setting up or configuring each of the devices (which are "smart" devices in that they each include a microprocessor capable of performing communication and, in some cases, control functions) as well as recognizing when new field devices are connected to the bus 34, when field devices are removed from the bus 34, receiving some of the data generated by the field devices 16–32, and interfacing with one or more user terminals, which may be located in the host 12 or in any other device connected to the host 12 in any manner.

The bus 34 supports or allows two-way, purely digital communication and may also provide a power signal to any or all of the devices connected thereto, such as the field devices 16–32. Alternatively,any or all of the devices 12–32 may have their own power supplies or may be connected to external power supplies via separate wires (not shown). While the devices 12–32 are illustrated in FIG. 1 as being connected to the bus 34 in a standard bus-type connection, in which multiple devices are connected to the same pair of wires making up the bus segments 34*a*, 34*b*, and 34*c*, the Fieldbus protocol allows other device/wire topologies including point-to-point connections, in which each device is connected to a controller or a host via a separate two-wire pair (similar to typical 4–20 mA analog DCS systems), and tree or "spur" connections in which each device is connected to a common point in a two-wire bus which may be, for example, a junction box or a termination area in one of the field devices within a process control network.

Data may be sent over the different bus segments 34*a*, 34*b*, and 34*c* at the same or different communication baud rates or speeds according to the Fieldbus protocol For example, the Fieldbus protocol provides a 31.25 Kbit/s communication rate (H1), illustrated as being used by the bus segments 34*b* and 34*c* of FIG. 1, and a 1.0 Mbit/s and/or a 2.5 Mbit/s (H2) communication rate, which will be typically used for advanced process control, remote input/output, and high speed factory automation applications and is illustrated as being used by the bus segment 34*a* of FIG. 1. Likewise, data may be sent over the bus segments 34*a*, 34*b*, and 34*c* according to the Fieldbus protocol using voltage mode signaling or current mode signaling. Of course, the maximum length of each segment of the bus 34 is not strictly limited but is, instead, determined by the communication rate, cable type, wire size, bus power option, etc. of that section.

The Fieldbus protocol classifies the devices that can be connected to the bus 34 into three categories, namely, basic devices, link master devices, and bridge devices. Basic devices (such as devices 18, 20, 24, and 28 of FIG. 1) can communicate, that is, send and receive communication signals on or from the bus 34, but are not capable of controlling the order or timing of communication that occurs on the bus 34. Link master devices (such as devices 16, 22, and 26 as well as the host 12 of FIG. 1) are devices that communicate over the bus 34 and are capable of controlling the flow of and the timing of communication signals on the bus 34. Bridge devices (such as devices 30 and 32 of FIG. 1) are devices configured to communicate on and to interconnect individual segments or branches of a Fieldbus bus to create larger process control networks. If desired, bridge devices may convert between different data speeds and/or different data signaling formats used on the different segments of the bus 34, may amplify signals traveling between the segments of the bus 34, may filter the signals flowing between the different segments of the bus 34 and pass only those signals destined to be received by a device on one of the bus segments to which the bridge is coupled and/or may take other actions necessary to link different segments of the bus 34. Bridge devices that connect bus segments that operate at different speeds must have link master capabilities at the lower speed segment side of the bridge. The hosts 12 and 15, the PLC 13, and the controllers 14 may be any type of Fieldbus device but, typically, will be link master devices.

Each of the devices 12–32 is capable of communicating over the bus 34 and, importantly, is capable of independently performing one or more process control functions using data acquired by the device, from the process, or from a different device via communication signals on the bus 34. Fieldbus devices are, therefore, capable of directly implementing portions of an overall control strategy which, in the past, were performed by a centralized digital controller of a DCS. To perform control functions, each Fieldbus device includes one or more standardized "blocks" which are implemented in a microprocessor within the device. In particular, each Fieldbus device includes one resource block and may include zero or more function blocks, and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA), and signal selector (SS) function blocks. However, other types of function blocks exist and new types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Most function blocks are capable of generating alarm or event indications based on predetermined criteria and are capable of operating differently in different modes. Generally speaking, function blocks may operate in an automatic mode, in which, for example, the algorithm of a function block operates automatically; an operator mode in which the input or output of, for example, a function block, is controlled manually; an out-of-service mode in which the block does not operate; a cascade mode in which the operation of the block is affected from (determined by) the output of a different block; and one or more remote modes in which a remote computer determines the mode of the block. However, other modes of operation exist in the Fieldbus protocol Importantly, each block is capable of communicating with other blocks in the same or different field devices over the Fieldbus bus 34 using standard message formats defined by the Fieldbus protocol. As a result, combinations of function blocks (in the same or different devices) may communicate with each other to produce one or more decentralized control loops. Thus, for example, a PID function block in one field device may be connected via the bus 34 to receive an output of an AI function block in a second field device, to deliver data to an AO function block in third field device, and to receive an output of the AO function block as feedback to create a process control loop separate and apart from any DCS controller. In this manner, combinations of function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

While the block objects discussed herein are referred to as "function blocks" in the context of the Fieldbus protocol, it will be apparent to those of ordinary skill in the art that process control networks using other communication protocols will include process function modules analogous to the described function blocks. Thus, although the examples in the following disclosure focus on the Fieldbus protocol, the present invention has application in networks using other communication protocols and is not limited to process control networks using the Fieldbus protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus 34.

Trend objects allow local trending of function block parameters for access by other devices such as the host 12 or controllers 14 of FIG. 1. Trend objects retain short-term historical data pertaining to some, for example, function block parameter and report this data to other devices or function blocks via the bus 34 in an asynchronous manner. Alert objects report alarms and events over the bus 34. These alarms or events may relate to any event that occurs within a device or one of the blocks of a device. View objects are predefined groupings of block parameters used in standard human/machine interfacing and may be sent to other devices for viewing from time to time.

Figure 2:
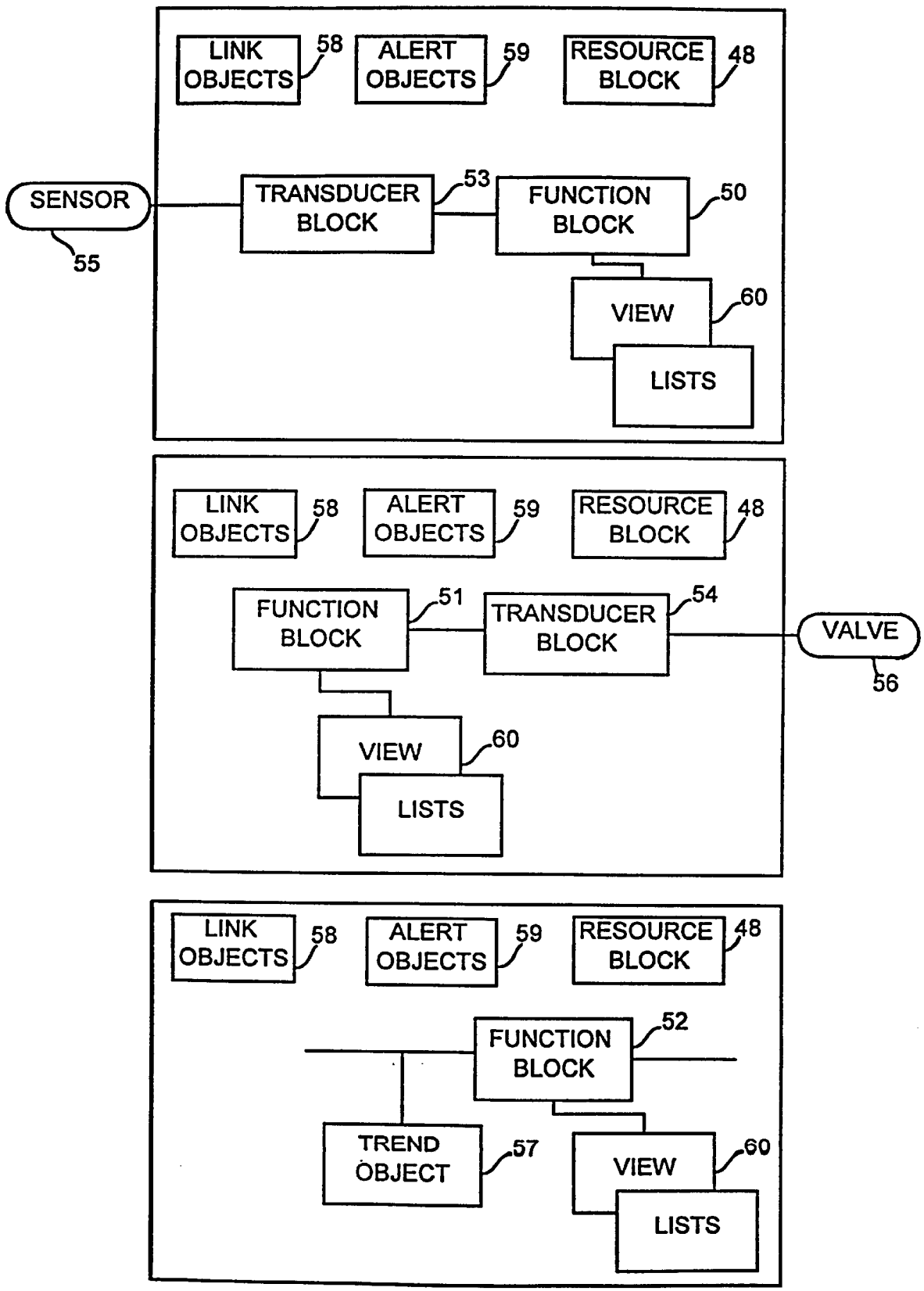
FIG. 2 is a schematic block diagram of a Fieldbus device having a set of three function blocks therein.

Referring now to FIG. 2, a Fieldbus device, which may be, for example, any of the field devices 16–28 of FIG. 1, is illustrated as including three resource blocks 48, three function blocks 50, 51, and 52 and two transducer blocks 53 and 54. One of the function blocks 50 (which may be an input function block) is coupled through the transducer block 53 to a sensor 55, which may be, for example, a temperature sensor, a set point indication sensor, etc. The second function block 51 (which may be an output function block) is coupled through the transducer block 54 to an output device such as a valve 56. The third function block 52 (which may be a control function block) has a trend object 57 associated therewith for trending the input parameter of the function block 52.

Link objects 58 define the block parameters of each of the associated blocks and alert objects 59 provide alarms or event notifications for the each of the associated blocks. View objects 60 are associated with each of the function blocks 50, 51, and 52 and include or group data lists for the function blocks with which they are associated. These lists contain information necessary for each of a set of different defined views. Of course, FIG. 2 is merely exemplary and other numbers of and types of block objects, link objects, alert objects, trend objects, and view objects may be provided in any field device.

Figure 3:
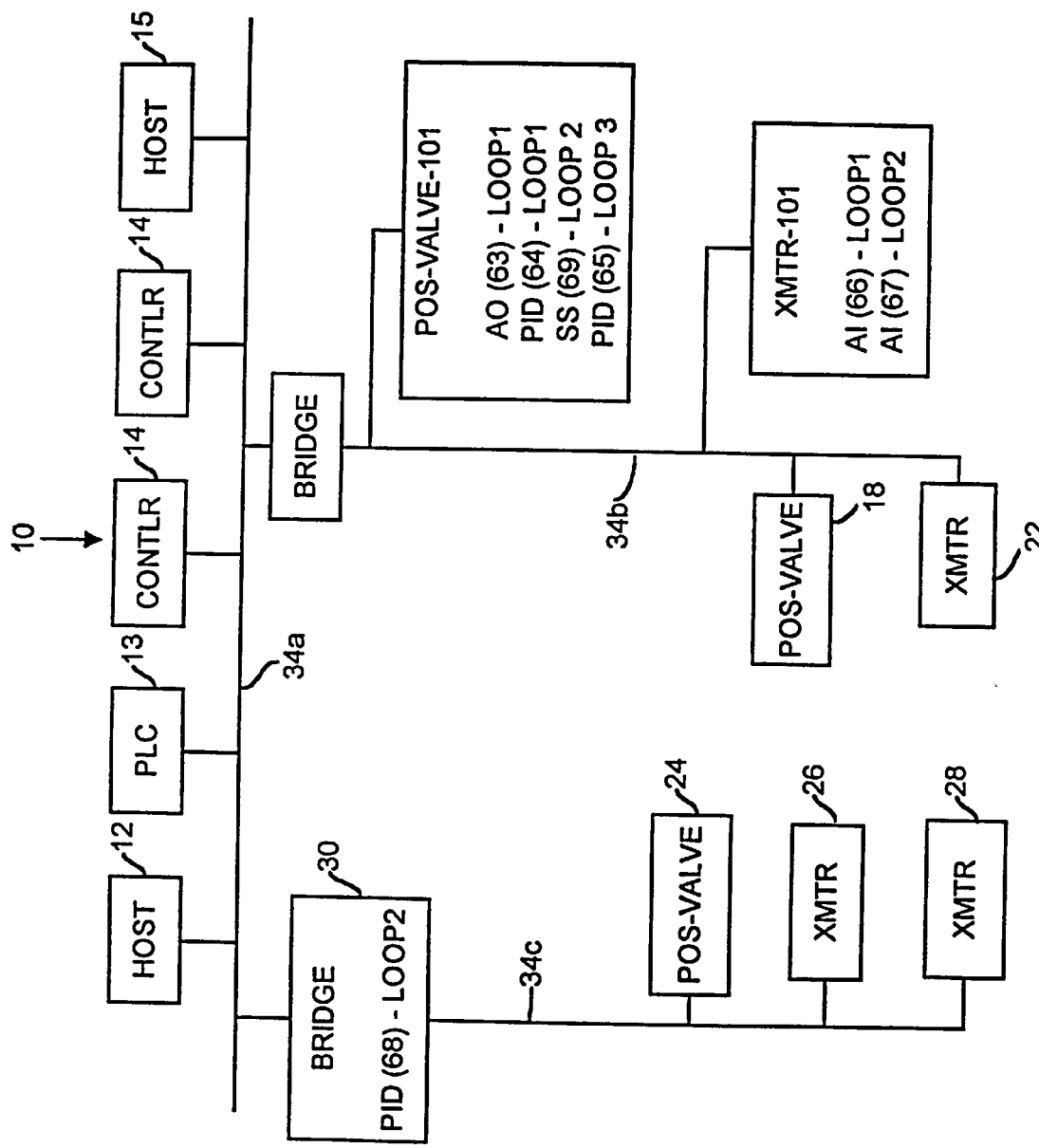
FIG. 3 is a schematic block diagram illustrating the function blocks within some of the devices of the process control network of FIG. 1.

Referring now to FIG. 3, a block diagram of the process control network 10 depicting the devices 16, 18, and 24 as positioner/valve devices and the devices 20, 22, 26, and 28 as transmitters also illustrates the function blocks associated with the positioner/valve 16, the transmitter 20, and the bridge 30. As illustrated in FIG. 3, the positioner/valve 16 includes a resource (RSC) block 61, a transducer (XDR) block 62, and a number of function blocks including an analog output (AO) function block 63, two PID function blocks 64 and 65, and a signal select (SS) function block 69. The transmitter 20 includes a resource block 61, two transducer blocks 62, and two analog input (AI) function blocks 66 and 67. Also, the bridge 30 includes a resource block 61 and a PID function block 68.

As will be understood, the different function blocks of FIG. 3 may operate together (by communicating over the bus 34) in a number of control loops and the control loops in which the function blocks of the positioner/valve 16, the transmitter 20, and the bridge 30 are located are identified in FIG. 3 by a loop identification block connected to each of these function blocks. Thus, as illustrated in FIG. 3, the AO function block 63 and the PID function block 64 of the positioner/valve 16 and the AI function block 66 of the transmitter 20 are connected within a control loop indicated as LOOP1, while the SS function block 69 of the positioner/valve 16, the AI function block 67 of the transmitter 20, and the PID function block 68 of the bridge 30 are connected in a control loop indicated as LOOP2. The other PID function block 65 of the positioner/valve 16 is connected within a control loop indicated as LOOP3.

Figure 4:
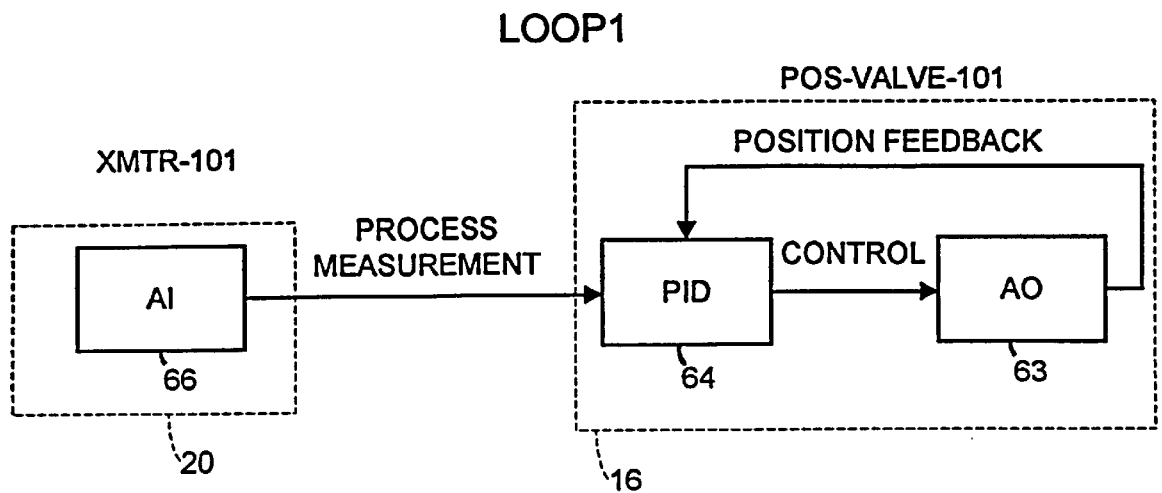
FIG. 4 is a control loop schematic for a typical process control loop within the process control network of FIG. 1.

The interconnected function blocks making up the control loop indicated as LOOP1 in FIG. 3 are illustrated in more detail in the schematic of this control loop depicted in FIG. 4. As can be seen from FIG. 4, the control loop LOOP1 is completely formed by communication links between the AO function block 63 and the PID function block 64 of the positioner/valve 16 and the AI function block 66 of the transmitter 20 (FIG. 3). The control loop diagram of FIG. 4 illustrates the communication interconnections between these function blocks using lines attaching the process and control inputs and outputs of these functions blocks. Thus, the output of the AI function block 66, which may comprise a process measurement or process parameter signal, is communicatively coupled via the bus segment 34b to the input of the PID function block 64 which has an output comprising a control signal communicatively coupled to an input of the AO function block 63. An output of the AO function block 63, which comprises a feedback signal indicating, for example, the position of the valve 16, is connected to a control input of the PID function block 64. The PID function block 64 uses this feedback signal along with the process measurement signal from the AI function block 66 to implement proper control of the AO function block 63. Of course the connections indicated by the lines in the control loop diagram of FIG. 4 may be performed internally within a field device when, as with the case of the AO and the PID function blocks 63 and 64, the function blocks are within the same field device (e.g., the positioner/valve 16), or these connections may be implemented over the two-wire communication bus 34 using standard Fieldbus synchronous communications. Of course, other control loops are implemented by other function blocks that are communicatively interconnected in other configurations.

To implement and perform communication and control activities, the Fieldbus protocol uses three general categories of technology identified as a physical layer, a communication"stack," and a user layer. The user layer includes the control and configuration functions provided in the form of blocks (such as function blocks) and objects within any particular process control device or field device.

The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus 34 and may be modeled by the well-known Open Systems Interconnect (OSI) layered communication model.

The physical layer, which corresponds to OSI layer 1, is embedded in each field device and the bus 34 and operates to convert electromagnetic signals received from the Fieldbus transmission medium (the two-wire bus 34) into messages capable of being used by the communication stack of the field device. The physical layer may be thought of as the bus 34 and the electromagnetic signals present on the bus 34 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 6. There is no corresponding structure for OSI layers 3–5 in the Fieldbus protocol. However, the applications of a Fieldbus device comprise a layer 7 while a user layer is a layer 8, not defined in the OSI protocol. Each layer in the communication stack is responsible for encoding or decoding a portion of the message or signal that is transmitted on the Fieldbus bus 34. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the bus 34 and manages access to the bus 34 according to a deterministic centralized bus scheduler called a link active scheduler, to be described in more detail below. The data link layer removes a preamble from the signals on the transmission medium and may use the received preamble to synchronize the internal clock of the field device with the incoming Fieldbus signal. Likewise, the data link layer converts messages on the communication stack into physical Fieldbus signals and encodes these signals with clock information to produce a "synchronous serial" signal having a proper preamble for transmission on the two-wire bus 34. During the decoding process, the data link layer recognizes special codes within the preamble, such as start delimiters and end delimiters, to identify the beginning and the end of a particular Fieldbus message and may perform a checksum to verify the integrity of the signal or message received from the bus 34. Likewise, the data link layer transmits Fieldbus signals on the bus 34 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 34 using a standard set of message formats and describes the communication services, message formats, and protocol behaviors required to build messages to be placed onto the communications tack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to read and change communication relationships, known as virtual communication relationships (VCRs) described hereinafter, associated with one or more objects of a device. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus 34 so that the proper data is provided to each function block before that block executes.

The way in which different field devices (and different blocks within field devices) communicate over the Fieldbus transmission medium will now be described with respect to FIG. 1. For communication to occur, one of the link master devices on each segment of the bus 34 (for example, devices 12, 16, and 26) operates as a link active scheduler (LAS) that actively schedules and controls communication on the associated segment of the bus 34. The LAS for each segment of the bus 34 stores and updates a communication schedule (a link active schedule) containing the times that each function block of each device is scheduled to start periodic communication activity on the bus 34 and the length of time for which this communication activity is to occur. While there may be one and only one active LAS device on each segment of the bus 34, other link master devices (such as the device 22 on the segment 34b) may serve as backup LASs and become active when, for example, the current LAS fails. Basic devices do not have the capability to become an LAS at any time.

Generally speaking, communication activities over the bus 34 are divided into repeating macrocycles, each of which includes one synchronous communication for each function block active on any particular segment of the bus 34 and one or more asynchronous communications for one or more of the functions blocks or devices active on a segment of the bus 34. A device may be active, i.e., send data to and receive data from any segment of the bus 34, even if it is physically connected to a different segment of the bus 34, through coordinated operation of the bridges and the LASs on the bus 34.

During each macrocycle, each of the function blocks active on a particular segment of the bus 34 executes, usually at a different, but precisely scheduled (synchronous) time and, at another precisely scheduled time, publishes its output data on that segment of the bus 34 in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus 34 publish data at the same time. During the time that synchronous communication is not occurring, each field device is allowed, in turn, to transmit alarm data, view data, etc. in an asynchronous manner using token driven communications. The execution times and the amount of time necessary to complete execution of each function block are stored in the management information base (MIB) of the device in which the function block resides while, as noted above, the times for sending the compel data commands to each of the devices on a segment of the bus 34 are stored in the MIB of the LAS device for that segment. These times are typically stored as offset times because they identify the times at which a function block is to execute or send data as an offset from the beginning of an "absolute link schedule start time," which is known by all of the devices connected to the bus 34.

To effect communications during each macrocycle, the LAS, for example, the LAS 16 of the bus segment 34b, sends a compel data command to each of the devices on the bus segment 34b according to the list of transmit times stored in the link active schedule. Upon receiving a compel data command, a function block of a device publishes its output data on the bus 34 for a specific amount of time. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data using a time-stamp.

After the LAS has sent a compel data command to each of the function blocks on particular segment of the bus 34 and during the times that function blocks are executing, the LAS may cause asynchronous communication activities to occur. To effect asynchronous communication, the LAS sends a pass token message to a particular field device. When a field device receives a pass token message, that field device has full access to the bus 34 (or a segment thereof) and can send asynchronous messages, such as alarm messages, trend data, operator set point changes, etc. until the messages are complete or until a maximum allotted "token hold time" has expired. Thereafter the field device releases the bus 34 (or any particular segment thereof) and the LAS sends a pass token message to another device. This process repeats until the end of the macrocycle or until the LAS is scheduled to send a compel data command to effect synchronous communication. Of course, depending on the amount of message traffic and the number of devices and blocks coupled to any particular segment of the bus 34, not every device may receive a pass token message during each macrocycle.

Figure 5:
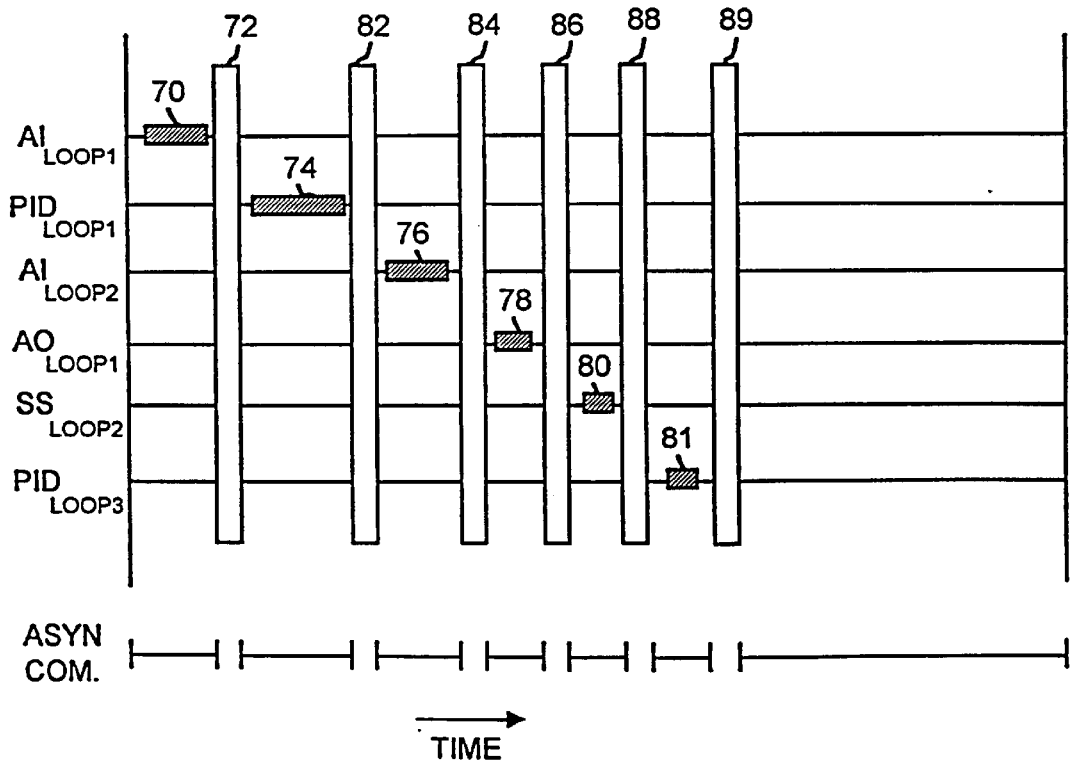
FIG. 5 is a timing schematic for a macrocycle of a segment of the bus of the process control network of FIG. 1.

FIG. 5 illustrates a timing schematic depicting the times at which function blocks on the bus segment 34b of FIG. 1 execute during each macrocycle of the bus segment 34b and the times at which synchronous communications occur during each macrocycle associated with the bus segment 34b. In the timing schedule of FIG. 5, time is indicated on the horizontal axis and activities associated with the different function blocks of the positioner/valve 16 and the transmitter 20 (of FIG. 3) are illustrated on the vertical axis. The control loop in which each of the functions blocks operates is identified in FIG. 5 as a subscript designation. Thus $AI_{LOOP1}$ refers to the AI function block 66 of the transmitter 20, $PID_{Loop1}$ refers to the PID function block 64 of the positioner/valve 16, etc. The block execution period of each of the illustrated function blocks is depicted by a cross-hatched box while each scheduled synchronous communication is identified by a vertical bar in FIG. 5.

Thus, according to the timing schedule of FIG. 5, during any particular macrocycle of the segment 34b (FIG. 1), the $AI_{LOOP1}$ function block executes first for the time period specified by the box 70. Then, during the time period indicated by the vertical bar 72, the output of the $AI_{LOOP1}$ function block is published on the bus segment 34b in response to a compel data command from the LAS for the bus segment 34b. Likewise, the boxes 74, 76, 78, 80, and 81 indicate the execution times of the function blocks $PID_{LOOP1}$, $AI_{LOOP2}$, $AO_{LOOP1}$, $SS_{LOOP2}$, and $PID_{LOOP3}$, respectively (which are different for each of the different blocks), while the vertical bars 82, 84, 86, 88, and 89 indicate the times that the function blocks $PID_{LOOP1}$, $AI_{LOOP2}$, $AO_{LOOP1}$, $SS_{LOOP2}$, and $PID_{LOOP3}$, respectively, publish data on the bus segment 34b.

As will be apparent, the timing schematic of FIG. 5 also illustrates the times available for asynchronous communication activities, which may occur during the execution times of any of the function blocks and during the time at the end of the macrocycle during which no function blocks are executing and when no synchronous communication is taking place on the bus segment 34b. Of course, if desired, different function blocks can be intentionally scheduled to execute at the same time and not all function blocks must publish data on the bus if, for example, no other device subscribes to the data produced by a function block.

Field devices are able to publish or transmit data and messages over the bus 34 using one of three virtual communication relationships (VCRs) defined in the Fieldbus access sublayer of the stack of each field device. A client/server VCR is used for queued, unscheduled, user initiated, one to one, communications between devices on the bus 34. Such queued messages are sent and received in the order submitted for transmission, according to their priority, without overwriting previous messages. Thus, a field device may use a client/server VCR when it receives a pass token message from an LAS to send a request message to another device on the bus 34. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgments, and device uploads and downloads.

A report distribution VCR is used for queued, unscheduled, user initiated one to many communications. For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 34 when the publisher device receives a compel data message from the LAS or from a subscriber device. The publisher/subscriber relationships are predetermined and are defined and stored within the Fieldbus access sublayer of the communication stack of each field device.

To assure proper communication activities over the bus 34, each LAS periodically sends a time distribution message to all of the field devices connected to a segment of the bus 34, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated Furthermore, each LAS (and other link master device) on each bus segment stores a "live list," which is a list of all the devices that are connected to that segment of the bus 34, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 34 to allow each link master device to maintain a current copy of the live list.

As noted above, the communication interconnections between the field devices and the function blocks thereof are determined by a process engineer and are implemented within the process control network 10 using a configuration application located in, for example, the host 12. However, after being configured, the process control network 10 operates without any consideration for compiling real time values of process parameters for viewing at a display device. Because the processing is decentralized in the process control network 10, no single device receives real time values for all of the process parameters of the process control network 10. When a user wants to accumulate and view real time information, the user currently has several alternatives for obtaining the information, each of which increases the complexity and bus traffic of the network.

In one alternative, a process control device, such as the controller 14 or host 15 of FIG. 3, is configured with a user interface that allows the user to request real time information from one or more of the field devices in the process control network 10. Upon receiving the request from the user interface, the process control device queues request messages for each field device (typically using asynchronous communications). When the process control device receives a pass token message from its associated LAS, the device sends the request messages to the field devices using client/server VCRs. The field devices receive the requests, format response messages with the current values of the requested process parameters, and transmit the response messages when pass token messages are received from their associated LASs. In this alternative, a significant amount of bus traffic is generated to retrieve the real time information. Two additional transactions, one request and one response, are generated for each field device that stores a requested process parameter. Additionally, because this alternative uses asynchronous transactions, several macrocycles may elapse before all the request messages are sent and the corresponding responses are received, thereby slowing the response time for the process control device to display the current value of the requested information. Moreover, the field devices are low power devices without extra CPU cycles available to provide process parameters for viewing.

In another alternative, trending objects within field devices store a certain number of messages containing process data in buffers and subsequently transmit packets of the buffered messages on the bus to other devices. The trend objects store the values of one or more process parameters either generated by function blocks within the field device or generated by function blocks in other field devices and transmitted on the bus. Once the trend object's buffer is full, the buffered data is transmitted using asynchronous communications either in response to receiving a request message for the trend data or automatically upon receipt of a pass token message for the field device. For process parameters transferred along the bus from one field device to the trend object in another field device, one or two additional transactions are required each time a packet of buffered messages is transmitted from the trend object to another field device. For process parameters transferred from a function block to a trend object within the same field device, trending the data is less efficient and requires more CPU cycles than publishing the messages immediately. In either situation, the trending operation reduces the efficiency of the bus network.

To overcome these problems in, for example, a Fieldbus process control network, a new type of function block is provided according to the present invention to obtain and distribute real time values for a multiplicity of process parameters for display at a viewing interface. The viewing function block, or information access function block, of the present invention is configured to communicate with function blocks of other devices over the bus 34 using synchronous periodic communications (e.g., the publisher/subscriber VCR of the Fieldbus protocol) to obtain real time values for a significant portion or a relevant subset of process parameters, to store one or more values of the process parameters, and to communicate with the function blocks of process control devices over the bus 34 using asynchronous communications (e.g., the client/server VCR of the Fieldbus protocol or equivalent communication relationship in a different protocol) to distribute the stored information when requested by a user through an interface. The stored values may also be communicated to external devices connected to and communicating with the field device containing the viewing function block via some other communication protocol or some other media, such as Ethernet. In this manner, the viewing function block is able to acquire real time values for process parameters without transmitting request messages to each individual field device. Furthermore, the user can retrieve the current values of all the process parameters that are of interest by issuing a single request message from the display device to the viewing function block.

Figure 6:
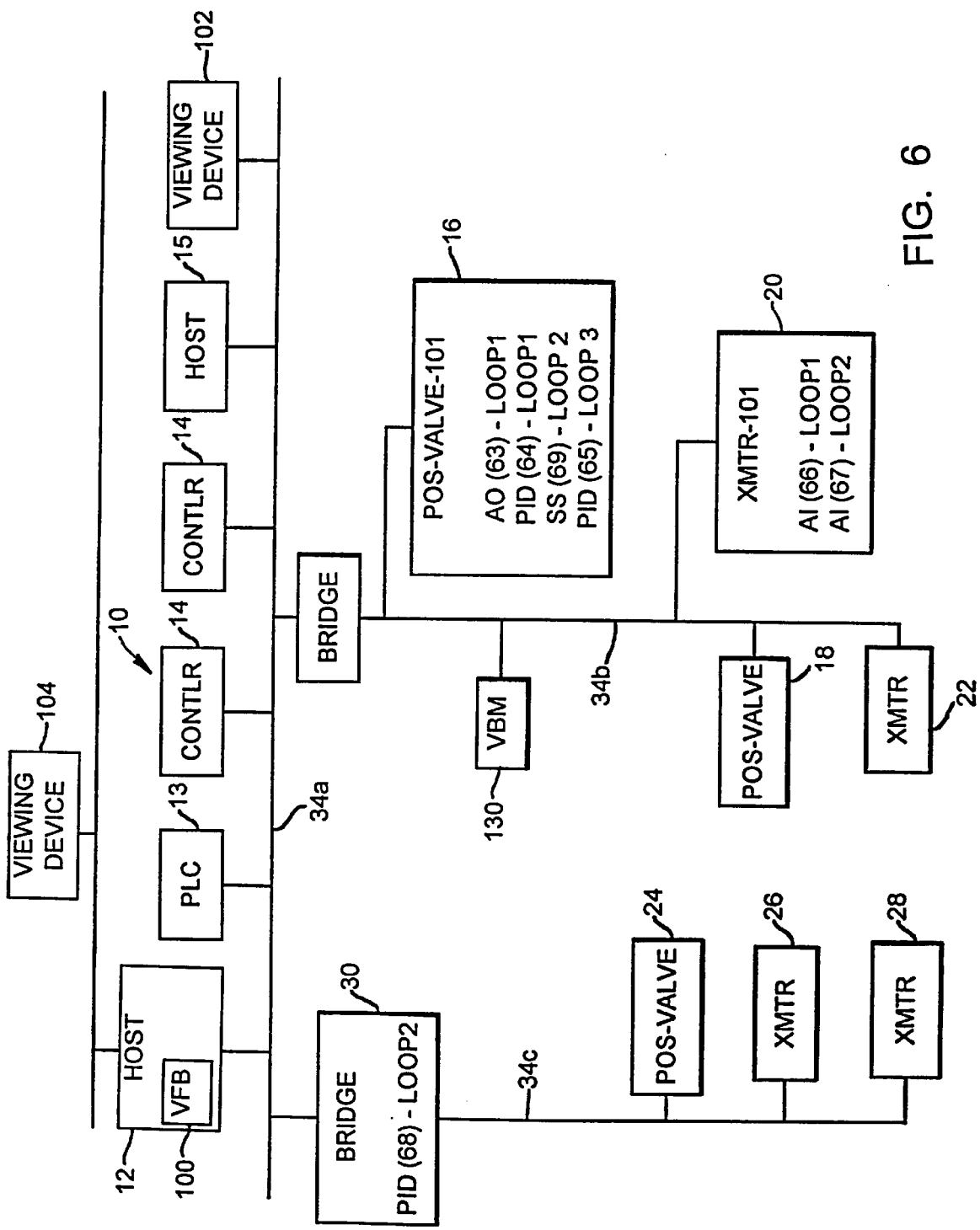
FIG. 6 is a schematic block diagram of a process control network incorporating a viewing function block and a viewing bus monitor according to the present invention.

Referring now to FIG. 6, a viewing function block 100 is illustrated as being located within host 12 of FIG. 3. The viewing function block 100 is typically located within a host device or other human interface device. The communication stack of the host 12 communicatively links the viewing function block 100 to the bus 34 so that the viewing function block 100 can communicate with all of the other devices in the process control network 10. For example, the users of the process control network 10 may want to have access to the real time value for the valve stem position of the positioner/valve 16, which may be stored in the AO function block 63. In order to transfer the most recently measured value of the valve stem position, a publisher/subscriber VCR is set up between the AO function block 63 and the viewing unction block 100. The AO function block 63 is defined as a "publisher" field device within the Fieldbus access sublayer of the communication stack of the positioner/valve 16. Correspondingly, the viewing function block 100 is defined as a "subscriber" field device within the Fieldbus access sublayer of the communication stack of the host 12. The viewing function block 100 may be one of many subscribers for each publisher message.

Ideally, the viewing function block 100 is a subscriber to published messages that are already transmitted on the bus segment 34a. For example, a PID function block in valve 24 on bus segment 34c may require the value of a process parameter from the PID function block 64 to control the operation of the valve 24. In order to transfer the value of the process parameter, a publisher/subscriber VCR is set up between the PID function block 64 and the PID function block within the valve 24. During each macrocycle, the PID function block 64 publishes a message with the value of the process parameter on the bus 34 in response to a compel data command generated by its associated LAS. The message travels from segment 34b to segment 34a and to segment 34c where the message is detected by the communication stack of the valve 24. The viewing function block 100 is set up as an additional subscriber to the message from the PID function block 64. Configured in this way, the communication stack of the host 12 detects the message on segment 34a and transfers the message to the viewing function block 100. The viewing function block 100 may replace or overwrite the previous value for the process parameter stored therein with the value from the published message. The new value for the parameter is stored in the viewing function block 100 until the next message is published by the PID function block 64. Alternatively, the viewing function block 100 may store multiple values of the parameter and append the new value to the existing stored values. In this situation, the process parameter is monitored by the viewing function block 100 without creating any additional bus traffic.

In some situations, the viewing function block 100 does not have access to messages that are not transmitted on its associated bus segment 34a. For example, messages passed between the AO function block 63 of the positioner/valve 16 and a function block in the transmitter 20 are transmitted on bus segment 34b only. Similarly, messages passed between two function blocks within the same field device, such as PID function block 64 and AO function block 63 in positioner/valve 16, are not transmitted on any bus segment.

To obtain the value of a process parameter exchanged in these situations, the viewing function block 100 is set up as an additional subscriber to the messages published by the PID function block 64. Configured in this way, the message is transmitted on segment 34b to segment 34a where the communication stack of the host 12 detects the message and transfers the message to the viewing function block 100. This arrangement results in an increase in bus traffic but does not require the field device to use additional CPU cycles to transmit additional messages and, therefore, does not increase the workload of the field device since the device is already publishing from the PID function block 64 internally to the AO function block 63 or externally to the function block in the transmitter 20.

In the rarest of situations, the viewing function block 100 is configured to monitor the value of a process parameter that is not otherwise transmitted between function blocks. For example, the AO function block 63 may store a process parameter for the positioner/valve that is not used by any other function blocks in the process control network 10 but is monitored by the viewing function block 100. In this situation, a separate publisher/subscriber VCR is set up between the AO function block 63 and the viewing function block 100. In response to a compel data command, the AO function block 63 publishes a message with the value of the process parameter that is detected by the communication stack of the host 12 and transferred to the viewing function block 100. In these rare situations, the bus traffic and the workload of the field device are increased slightly by transmitting the additional message.

The viewing function block 100 is configured to meet the needs of the users of the process control network 10. The viewing function block 100 may be configured to simultaneously receive and store data from a multiplicity of function blocks of the process control network 10. This may include data from all the function blocks, from a significant portion of the function blocks, or from a relevant subset of the function blocks. Additionally, the viewing function block 100 may be configured to receive and store a multiplicity of process parameters from any single function block. Moreover, the process control network 10 may include a plurality of viewing function blocks, with each viewing ftmction block receiving and storing a relevant subset of the process parameters of the network.

The information stored in the viewing function block 100 may be retrieved by the user by requesting the values of one or more process parameters at a human interface device, such as one of the hosts 12, 15, a display device 102 also connected to the bus 34, or an external display device 104 connected to and communicating with the host 12 via Ethernet or some other communication protocol. For example, a user at the display device 102 uses a human interface or graphical user interface to select one or more process parameters for viewing, one of which may be the valve stem position of positioner/valve 16. The display device 102, which includes a communication stack, formats a request message for the viewing function block 100 and queues the message for asynchronous communication. When the display device 102 receives a pass token from the associated LAS, the display device 102 transmits the message on the bus 34. The host 12 receives the request message and passes it on to the viewing function block 100. The viewing function block 100 retrieves the requested information,e.g., the valve stem position, stored therein and formats and queues a response message. When the host 12 receives a pass token message for the viewing function block 100 from the associated LAS, the host 12 transmits the message on the bus 34. The display device 102 receives the response message and displays the process parameters, including the valve stem position, at the user interface.

Figure 7:
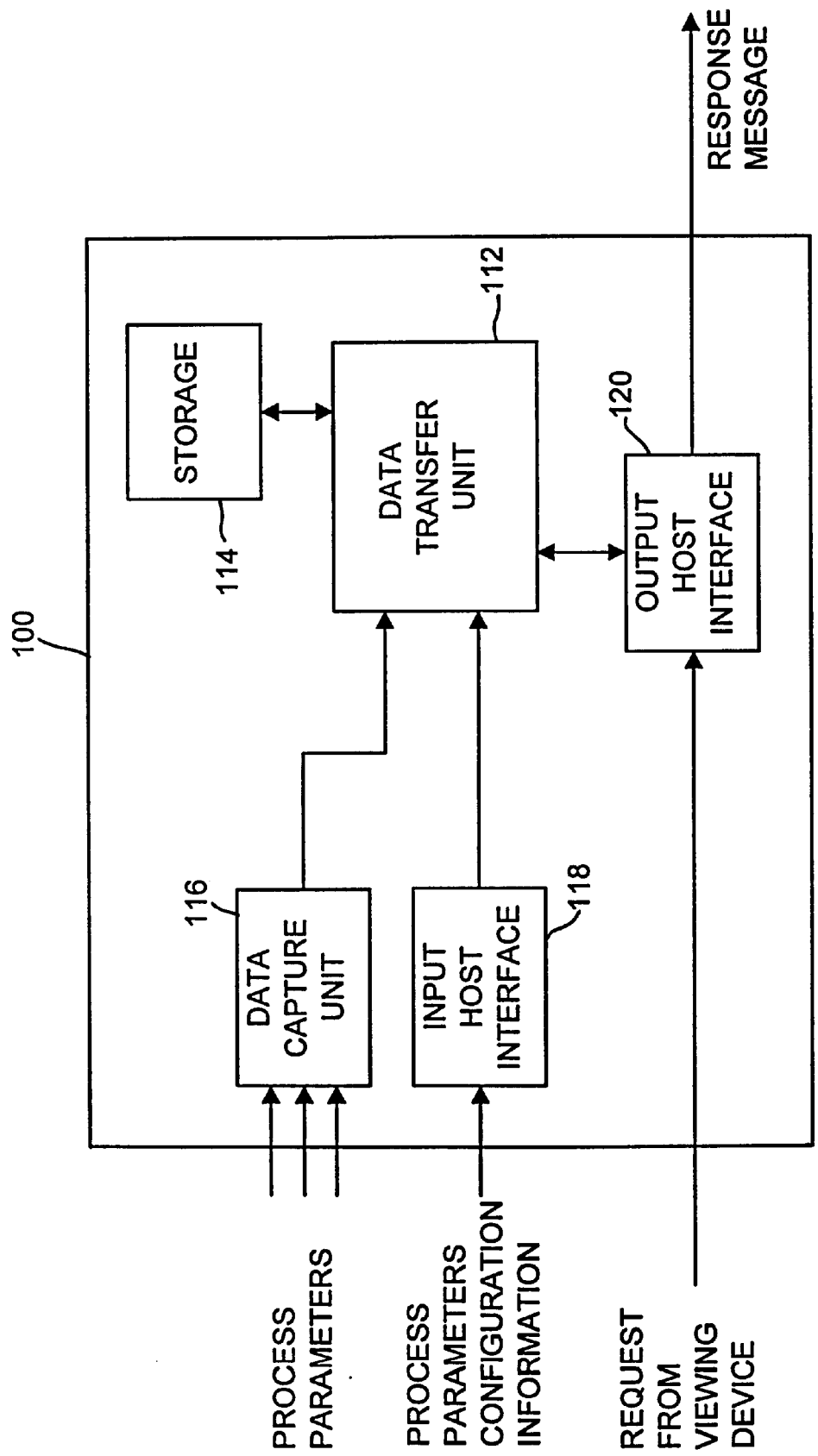
FIG. 7 is a schematic functional block diagram of the viewing function block of FIG. 6.

The viewing function block 100, illustrated in more detail in FIG. 7, includes a data transfer unit 112 that receives and decodes published process parameters from a multiplicity of field devices, stores the published values of the process parameters in a storage unit 114, recalls and transmits requested process parameters from the storage unit 114 to requesting viewing devices, and generally controls the operation of the viewing function block 100. The data transfer unit 112 enables a data capture unit 116 to collect and transfer the process parameters that are published by the other function blocks within the process control network 10 and that are sent to the viewing function block 100 using scheduled periodic communications. As will be understood, any number of process parameters may be delivered to the data capture unit 116 depending upon the manner in which the viewing function block 100 is configured.

The storage unit 114 is a memory for storing the process parameters that are published by the field devices. The storage unit 114 has a capacity that is suitable for monitoring a multiplicity of process parameters and its size is dependent on the number of process parameters to be monitored, the number of values of the monitored parameters to be stored, the amount of information associated with the monitored parameters that is stored with the monitored parameters, the resolution or sampling rate of the stored data and the like. The function blocks update the values and publish messages for their respective process parameters during each macrocycle. In some cases, the viewing function block 110 monitors a process parameter at a high resolution with the data transfer unit 112 frequently updating the value of the parameter in the storage unit 114. The update may occur as frequently as once per macrocycle such that each published value is stored in the storage unit 114. In other cases, the viewing function block 110 monitors a process parameter at a low resolution with the data transfer unit 112 updating the value of the parameter in the storage unit 114 less frequently than every macrocycle so that less than all of the published values of the parameter are stored in the storage unit 114. In either case, a time stamp indicating the time at which a value was measured may also be stored in the storage unit 114 along with the value of a process parameter. Moreover, the storage unit 114 may store a storage algorithm that is associated with a monitored process parameter. The storage algorithm may operate on the monitored parameter to perform functions such as filtering, anti-aliasing, data compression and the like.

As discussed above, the data transfer unit 112 manages the storage space in the storage unit 114. For any given process parameter, the data transfer unit 112 allocates enough space in the storage unit 114 to store one or more values of the process parameter. When the data transfer unit 112 receives the value of the process parameter from the associated field device through the data capture unit 116, the data transfer unit 112 overwrites the stored value of the process parameter in the storage unit 114 with the value from the published message or appends the value from the message to the values already stored therein. The data transfer unit 112 may also manipulate the process parameter by executing a storage algorithm associated with the parameter and stored in the storage unit 114. When the data transfer unit 112 receives a request for the process parameter from a viewing device, the stored value or values of the process parameter are retrieved from the storage unit 114 by the data transfer unit 112 and are sent to the viewing device in a response message. If desired, a time stamp or other information associated with the stored process parameters may also be stored in the storage unit 114 and retrieved by the data transfer unit 112.

An input host interface 118 within the viewing function block 100 receives configuration information entered by the user at a human interface of the host 12. The configuration information may include identification information of the process parameter to be stored, the field device and/or function block associated with the process parameter, the units for the parameter, the amount of storage required for the parameter and may include any other associated data, and instructions or storage algorithms for any data manipulation of the process parameter that the data transfer unit 112 may be required to perform. The input host interface 118 transfers the configuration information to the data transfer unit 112, which in turn allocates space in the storage unit 114 for the process parameter and the associated information. The configuration information may also include revisions to process parameters currently stored by the viewing function block 100 if, for example, a field device, such as the positioner/valve 16, is replaced by an upgraded positioner/valve or a valve from a different vendor. Additionally, the configuration information may include an instruction to cease storing a process parameter and reallocate the space in the storage unit 114 if, for example, a field device is removed from the process control network 10 altogether.

The viewing function block 100 further includes an output host interface 120 for processing request messages from the viewing devices. The request messages received by the host 12 may include requests for one or more process parameters, requests to convert the units of the process parameters, and/or instructions for formatting the retrieved process parameters. The output host interface 120 receives the requests from the host 12 and transfers, to the data transfer unit 112, the portions of the requests that will be processed by the data transfer unit 112. For example, the data transfer unit 112 may handle only the retrieval of the process parameter values from the storage unit 114 with the output host interface 120 handling all conversion and formatting functions. In this case, the output host interface 120 would pass the process parameter request to the data transfer unit 112 and, upon receiving the process parameter value from the data transfer unit 112, the output host interface 120 would perform the necessary conversions and formatting. Alternatively, the data transfer unit 112 may retrieve the process parameter values from the storage unit 114 and also perform conversions and formatting In this case, the output host interface 120 passes the entire request message to the data transfer unit 112 and, after the data transfer unit 112 processes the request, outputs the response message to the communication stack of the host 12 for transmission to the viewing device on the bus 34.

It should be noted at this point that FIG. 7 depicts a functional block diagram as a basis for describing the functionality of the viewing function block 100. The functionality described herein may be allocated differently among the elements of the viewing function block 100. For example, the functions performed by the data capture unit 116 could be incorporatd in their entirety into the functionality of the data transfer unit 112. The functionality of the input host interface 118 and output host interface 120 could be combined in a single host interface unit handling both input and output messages. Additionally, portions of the functionality described herein may be reallocated between the viewing function block 100 and other devices in the process control network 10. For example, the viewing function block 100 could function solely as a repository for the current values of the process parameters while the field devices perform any required conversions and the viewing devices perform all display formatting functions. Moreover, the viewing device requesting the process parameters may include a preformatted screen and, therefore, only require the viewing function block 100 to provide the stored values of the process parameters without any additional manipulation of the requested data. Other functional allocations and distributions will be obvious to those of ordinary skill in the art and are contemplated by the inventors as having use with the viewing function block according to the present invention.

Although the viewing function block 100 has been described herein as storing and transmitting a valve stem position provided by an PID function block 64 of a positioner/valve 16, the viewing function block 100 of the present invention can be used in conjunction with other function blocks and other field devices as desired and can be implemented in process control networks having configurations other than that illustrated in FIG. 6. Thus, for example, the viewing function block 100 could be configured to store process parameters from some or all of the function blocks in a process control network, and to transmit some or all of the stored process parameters to each of a plurality of viewing devices.

Moreover, while the viewing function block described herein has been implemented in the form of a Fieldbus "function block," it is noted that the viewing functionality of the present invention can be implemented using other types of blocks, programs, hardware, firmware, etc., associated with other types of control systems and/or communication protocols. In fact, while the Fieldbus protocol uses the term "function block" to describe a particular type of entity capable of performing a process control function, it is noted that the term function block as used herein is not so limited and includes any sort of device, program, routine, or other entity capable of performing a process control function in any manner at distributed locations within a process control network. Thus, the viewing function blocks described and claimed herein can be implemented in other process control networks or using other process control communication protocols or schemes (that may now exist or that may be developed in the future) which do not use what the Fieldbus protocol strictly identifies as a "function block" as long as these networks or protocols provide for or allow control functions to be performed at distributed locations within a process.

Still further, while viewing function blocks have been described herein as being used in storing and transmitting process parameters for positioner/valve devices, it is noted that these function blocks can be used to store and transmit process parameters for other types of devices, such as dampers, fans, sensors, host devices, controllers, bridge devices, interfaces, or any other device that may be a component of the process control network.

Moreover, although the viewing functionality described herein is preferably implemented in software stored in a process control device, it may alternatively or additionally be implemented in hardware, firmware, etc., as desired. If implemented in software, the viewing function block of the present invention may be stored in any computer readable memory such as on a magnetic disk, a laser disk, or other storage medium, in a RAM or ROM of a computer, etc. Likewise, this software may be delivered to a user or a device via any known or desired delivery method including, for example, over a communication channel such as a telephone line, the Internet, etc.

In another embodiment of the present invention, a new type of bus monitor is provided to obtain and display real time values for a multiplicity of process parameters. Whereas previously known bus monitors collected communication and diagnostics information for evaluation of the performance of the bus network, the viewing bus monitor of the present invention is adapted to collect, store and display process data that is transmitted on the bus for evaluation of the performance of the process control network. Process data is defined as the unique parameters related to the operation and control of the process and to maintaining the equipment directly associated with the process. Process data includes, but is not limited to, data such as set points, process variables, alarms, trending information and the like, or any other information that is directly related to process action or sensors in the process or devices connected directly to the process.

The viewing bus monitor according to the present invention is configured to capture all of the data transmitted over the bus 34 and to filter the captured data to obtain the process data on the network and to discard the communication and diagnostics information. The obtained process data may be further filtered to yield real time values for a significant portion or a relevant subset of process parameters. The viewing bus monitor stores one or more values of the process parameters, and displays the stored information when requested by a user through a human interface. In this manner, the viewing bus monitor is able to acquire real time values for process parameters without transmitting request messages to each individual field device. Furthermore, the user can retrieve the current values of all the process parameters that are of interest by requesting the information at the human interface of the viewing bus monitor.

Referring back to FIG. 6, a viewing bus monitor 130 is illustrated as being connected to the bus 34 at segment 34*b*. The viewing bus monitor 130 constantly listens to the bus traffic on segment 34*b* and captures all the transactions that are transmitted on segment 34*b*. The viewing bus monitor 130 discards communication and diagnostics messages in the bus traffic and removes headers, trailers and the like from the messages containing process data. The remaining process data is filter or sorted by the viewing bus monitor 130 to obtain real time values for one process parameter, a significant portion of process parameters, or a relevant subset of process parameters that the viewing bus monitor is configured to monitor. The viewing bus monitor 130 is communicatively linked to the bus 34 so that the viewing bus monitor 130 can capture messages transmitted on the bus 34 by all of the other devices in the process control network 10. For example, the users of the process control network 10 may want to have access to the real time value for the valve stem position of the positioner/valve 16, which may be stored in the AO function block 63 and transmitted to a function block within the positioner/valve 24. In order to capture the most recently measured value of the valve stem position, the viewing bus monitor 130 is configured to identify the message containing the valve stem position that is transmitted from the AO function block 63 to the positioner/valve 24. When the message is transmitted by the AO function block 63, the viewing bus monitor 130 captures the message, distinguishes the message from other communication, diagnostic and process data messages, and stores the value of the valve stem position contained therein.

The viewing bus monitor 130 is configured to meet the needs of the users of the process control network 10. The viewing bus monitor 130 may be configured to simultaneously receive and store data from a multiplicity of function blocks of the process control network 10. This may include data from all the function blocks, from a significant portion of the function blocks, or from a relevant subset of the function blocks. Additionally, the viewing bus monitor 130 may be configured to receive and store a multiplicity of process parameters from any single function block. Moreover, the process control network 10 may include a plurality of viewing bus monitors, with each viewing bus monitor receiving and storing a relevant subset of the process parameters of the network.

The information stored in the viewing bus monitor 130 may be retrieved by the user by requesting the values of one or more process parameters at a human interface at the viewing bus monitor 130. For example, a user at the viewing bus monitor 130 uses a human interface or graphical user interface to select one or more process parameters for viewing, one of which may be the valve stem position of positioner/valve 16. The stored values of the selected process parameters are retrieved from storage within the viewing bus monitor 130 and displayed at the user interface.

Figure 8:
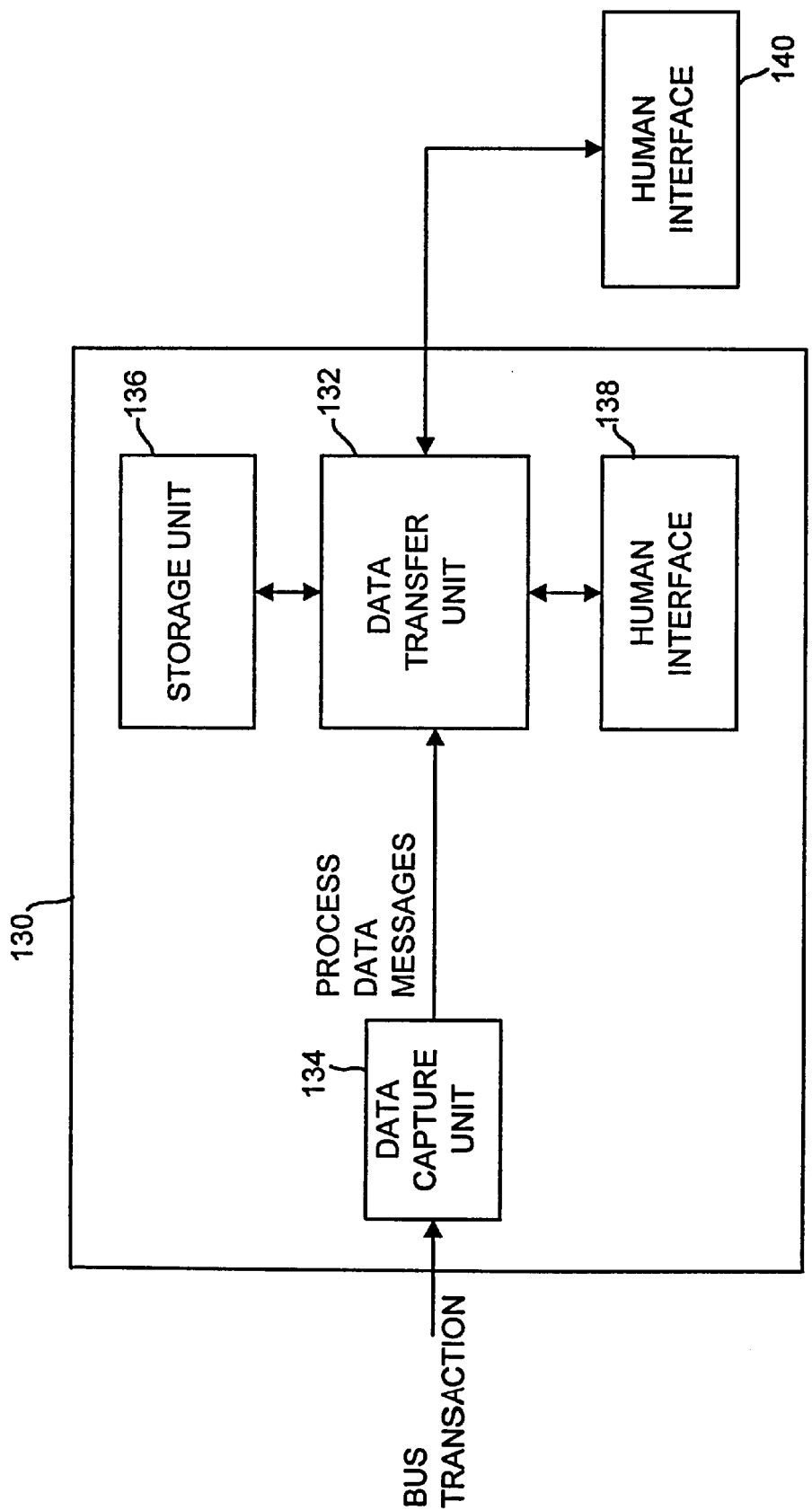
FIG. 8 is a schematic functional block diagram of the viewing bus monitor of FIG. 6.

The viewing bus monitor 130, illustrated in more detail in FIG. 8, includes a data transfer unit 132 that generally controls the operation of the viewing bus monitor 130. The data transfer unit 132 enables a data capture unit 134 to capture the messages in the bus traffic on the bus 34 and to discard the communications and diagnostics messages and transfer to the data transfer unit 132 only the process data messages that are published by the function blocks within the process control network 10. The data transfer unit 132 receives the process data messages from the data capture unit and discards components of the process data messages such as headers, trailers, timing information and the like. The data transfer unit 132 filters out the values of the process parameters that the viewing bus monitor 130 is configured to monitor and stores the published values of the process parameters in a storage unit 136. Upon requests from a human interface 138 or 140, the data transfer unit 132 recalls and transmits requested process parameters from the storage unit 136 to the requesting human interface 138 or 140 for display.

The storage unit 136 is a memory for storing the process parameters that are extracted from the process data messages. The storage unit 136 has a capacity that is suitable for monitoring a multiplicity of process parameters and its size is dependent on the number of process parameters to be monitored, the number of values of the monitored parameters to be stored, the amount of information associated with the monitored parameters that is stored with the monitored parameters, the resolution or sampling rate of the stored data and the like. The function blocks update the values and publish messages for their respective process parameters during each macrocycle. In some cases, the viewing bus monitor 130 monitors a process parameter at a high resolution with the data transfer unit 132 frequently updating the value of the parameter in the storage unit 134. The update may occur as frequently as once per macrocycle such that each published value is stored in the storage unit 134. In other cases, the viewing bus monitor 130 monitors a process parameter at a low resolution with the data transfer unit 132 updating the value of the parameter in the storage unit 134 less frequently than every macrocycle so that less than all of the published values of the parameter are stored in the storage unit 134. In either case, a time stamp indicating the time at which a value was measured may also be stored in the storage unit 136 along with the value of a process parameter. Moreover, the storage unit 136 may store a storage algorithm that is associated with a monitored process parameter. The storage algorithm may operate on the monitored parameter to perform functions such as filtering, anti-aliasing, data compression and the like.

As discussed above, the data transfer unit 132 manages the storage space in the storage unit 136. For any given process parameter, the data transfer unit 132 allocates enough space in the storage unit 136 to store one or more values of the process parameter. When the data transfer unit 132 extracts the value of the process parameter from the process data message transferred from the data capture unit 134, the data transfer unit 132 overwrites the stored value of the process parameter in the storage unit 136 with the value from the published message or appends the value from the message to the values already stored therein. The data transfer unit 132 may also manipulate the process parameter by executing a storage algorithm associated with the parameter and stored in the storage unit 136. When the data transfer unit 132 receives a request for the process parameter from one of the human interfaces 138, 140, the stored value or values of the process parameter are retrieved from the storage unit 136 by the data transfer unit 132 and sent to the requesting human interface 138 or 140 for display. If desired, a time stamp or other information associated with the stored process parameters may also be stored in the storage unit 136 and retrieved by the data transfer unit 132.

The human interface 138 within the viewing bus monitor 130 is adapted to allow a user to enter configuration information for the viewing bus monitor 130. The configuration information may include identification information of the process parameter to be stored, the field device and/or function block associated with the process parameter, the units for the parameter, the amount of storage required for the parameter and any other associated data, and instructions or storage algorithms for any data manipulation of the process parameter that the data transfer unit 132 may be required to perform. The human interface 138 transfers the configuration information to the data transfer unit 132, which in turn allocates space in the storage unit 136 for the process parameter and the associated information. The configuration information may also include revisions to process parameters currently stored by the viewing bus monitor 130 if, for example, a field device, such as the positioner/valve 16, is replaced by an upgraded positioner/valve or a valve from a different vendor. Additionally, the configuration information may include an instruction to cease storing a process parameter and reallocate the space in the storage unit 136 if, for example, a field device is removed from the process control network 10 altogether.

The human interface 138 also allows a user to enter requests to display information stored within the viewing bus monitor 130. The request messages may include requests for one or more process parameters, requests to convert the units of the process parameters, and/or instructions for formatting the retrieved process parameters. The human interface 138 transfers to the data transfer unit 132 the portions of the requests that will be processed by the data transfer unit 132. For example, the data transfer unit 132 may handle only the retrieval of the process parameter values from the storage unit 136 with the human interface 138 handling all conversion and formatting functions. In this case, the human interface 138 would pass the process parameter request to the data transfer unit 132 and, upon receiving the process parameter value from the data transfer unit 132, the human interface 138 would perform the necessary conversions and formatting. Alternatively, the data transfer unit 132 may retrieve the process parameter values from the storage unit 136 and also perform conversions and formatting. In this case, the human interface 138 passes the entire request message to the data transfer unit 132 and, after the data transfer unit 132 processes the request, displays the converted and format information at the display of the viewing bus monitor 130.

The external human interface 140 may be provided to allow a user to enter configuration information,information requests, or both, from a location remote from the viewing bus monitor 130. The external human interface 140 operates in the same manner as the internal human interface 138 as described above. The human interface 140 may be connected to the viewing bus monitor 130 by any known medium, and communicates with the data transfer unit 132 to transfer data using any known data transfer protocol, such as TCPIP, data streaming, Ethernet or the like. Additionally, the viewing bus monitor 130 may include both an internal human interface 138 and an external human interface 140 as shown in FIG. 8, or may have only a single human interface 138 or 140, depending on the requirements for a particular application.

It should be noted at this point that FIG. 8 depicts a functional block diagram as a basis for describing the functionality of the viewing bus monitor 130. The functionality described herein may be allocated differently among the elements of the viewing bus monitor 130. For example, the functions performed by the data capture unit 134 could be incorporated in their entirety into the functionality of the data transfer unit 132. Additionally, the functions performed by the data capture unit 134 and the human interface 138 could be allocated in the manners described above or in other alternative configurations. Other fuinctional allocations and distributions will be obvious to those of ordinary skill in the art and are contemplated by the inventors as having use with the viewing function block according to the present invention.

Although the viewing bus monitor 130 has been described herein as storing and displaying a valve stem position provided by PID function block 64 of a positioner/valve 16, the viewing bus monitor 130 of the present invention can be used in conjunction with other function blocks and other field devices as desired and can be implemented in process control networks having configurations other than that illustrated in FIG. 6. Thus, for example, the viewing bus monitor 130 could be configured to store process parameters from some or all of the function blocks in a process control network, and to display some or all of the stored process parameters at the human interfaces 138, 140.

Moreover, while the viewing bus monitor described herein has been implemented in a process control network operating under a Fieldbus protocol, it is noted that the viewing finctionality of the present invention can be implemented using other types of programs, hardware, firmware, etc., associated with other types of control systems and/or communication protocols. In fact, while the Fieldbus protocol uses the term "function block" to describe a particular type of entity capable of performing a process control function, it is noted that the term function block as used herein is not so limited and includes any sort of device, program, routine, or other entity capable of performing a process control function in any manner at distributed locations within a process control network. Thus, the viewing bus monitor described and claimed herein can be implemented in process control networks that use other process control communication protocols or schemes (that may now exist or that may be developed in the future) as long as these networks or protocols provide for or allow control functions to be performed at distributed locations within a process.

Still further, while viewing bus monitors have been described herein as being used in storing and transmitting process parameters for positioner/valve devices, it is noted that these bus monitors can be used to store and transmit process parameters for other types of devices, such as dampers, fans, sensors, host devices, controllers, bridge devices, interfaces, or any other device that may be a component of the process control network.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of viewing real time process information in a process control network having a plurality of devices communicatively linked on a bus, wherein each of the devices includes at least one process function module capable of performing a process control function within the process control network using process parameters and capable of communicating on the bus using scheduled periodic communications, and wherein at least one of the devices includes a viewing process function module capable of storing values of process parameters without using the values to perform process control, of being configured by a user to store at least one process parameter, and of retrieving values of the process parameters in response to a request generated by a user selecting at least one process parameter from a plurality of selectable process parameters, the method comprising the steps of:

configuring the viewing process function module to store at least one value of each of at least one process parameter, each of the at least one process parameter being associated with one of the process function modules;

communicatively linking an output of each of the process function modules associated with each of the at least one process parameter to an input of the viewing process function module using the scheduled periodic communications;

transmitting a value of the at least one process parameter from the associated process function module to the viewing process function module using the scheduled periodic communications; and storing the transmitted value of the at least one process parameter in the viewing process function module.

2. A method of viewing real time process information in a process control network according to claim 1, wherein the at least one process parameter is a plurality of process parameters.

3. A method of viewing real time process information in a process control network according to claim 1, further comprising the steps of:

configuring the viewing process function module to store information associated with the at least one process parameter; and transmitting information associated with the at least one process parameter to the viewing process function module concurrently with the value of the at least one process parameter.

4. A method of viewing real time process information in a process control network according to claim 1, wherein the transmitting step further comprises the step of transmitting a value of the at least one process parameter from the associated process function module to a plurality of process function modules using the scheduled periodic communications.

5. A method of viewing real time process information in a process control network according to claim 1, wherein the viewing process function module is a viewing function block in a Fieldbus protocol.

6. A method of viewing real time process information in a process control network according to claim 1, further comprising the steps of:
connecting at least one device including an output process function module having a human interface to the bus;
communicatively linking an output of the at least one output process function module to the viewing process function module using the unscheduled queued communications;
transmitting requests for at least one stored value of the at least one process parameter from the at least one output process function module to the viewing process function module using the unscheduled queued communications,
communicatively linking the output of the viewing process function module to an input of the at least one output process function module using the unscheduled queued communications;
transmitting a response containing the at least one stored value of the at least one process parameter from the viewing process function module to the at least one output function process function module using the unscheduled queued communications; and
displaying the at least one stored value of the process parameter at the human interface of the at least one output process function modules.

7. A method of viewing real time process information in a process control network according to claim 6, wherein the at least one display device comprises a plurality of display devices, each of the display devices including an output process function module having a human interface.

8. A method of viewing real time process information in a process control network according to claim 6, wherein the at least one display device is the at least one of the devices including the viewing process function module.

9. A method of viewing real time process information in a process control network according to claim 1, the method further comprising the steps of:
connecting the at least one of the devices to a second bus of a second process control network, wherein each of the devices connected to the second bus is capable of communicating on the second bus using unscheduled queued communications;
connecting a display device including an output process function module having a human interface to the second bus of the second process control network;
communicatively linking an output of the output process function module to the viewing process function module using the unscheduled queued communications;
transmitting a request for at least one stored value of the at least one process parameter from the output process function module to the viewing process function module using the unscheduled queued communications;
communicatively linking an output of the viewing process function module to an input of the output process function module using the unscheduled queued communications;
transmitting a response containing the at least one stored value of at least one process parameter from the viewing process function module using the unscheduled queued communications; and
displaying the at least one stored value of the at least one process parameter at the human interface.

10. An information viewing system for viewing real time values of process parameters in a process control network having a plurality of devices communicatively linked over a bus, wherein each of the devices is capable of performing a process function and of communicating on the bus using scheduled and unscheduled periodic communications, the information viewing system comprising:
a first signal generator disposed in a first device that generates input signals including values of at least one process parameter associated with the first device;
a first communicator coupled to the first signal generator and configured to deliver the input signals to an input of a second device using scheduled periodic communications;
a data capture unit disposed in the second device that receives the input signals;
a storage unit disposed in the second device and communicatively linked to the data capture unit, the storage unit adapted to store at least one value of at least one process parameter without using the at least one value to perform process control;
a second signal generator disposed in one of the first device, the second device and a third device that generates request signals requesting at least one value of one or more of the at least one process parameter stored in the storage unit wherein the request signals are generated in response to a user selecting process parameters from a plurality of selectable process parameters;
a second communicator coupled to the second signal generator and configured to deliver the request signals to an input of the second device using the unscheduled queued communications, the request signals being received by the data capture unit;
a data transfer unit disposed in the second device that generates response signals including the requested values of the one or more of the at least one process parameter from the storage unit;
a third communicator coupled to the data transfer unit and configured to deliver the response signals to an input of the one of the first device, the second device and third device using the unscheduled queued communications;
a signal receiver that receives the response signals generated by the data transfer unit; and
a display device disposed in the one of the first device, the second device and the third device that displays the requested values of the one or more of the at least one process parameter at a human interface.

11. An information viewing system according to claim 10, wherein the data transfer unit is communicatively linked to the data capture unit and the storage unit and adapted to receive the values of the at least one process parameter from the data capture unit and to cause the storage unit to overwrite the stored value of the at least one process parameter with the received values.

12. An information viewing system according to claim 11, wherein the data transfer unit is adapted to configure the storage unit to store at least one value of at least one process parameter, and further comprising an input host interface disposed in the second device and communicatively linked to the data transfer unit, the input host interface adapted to transfer process parameter configuration instructions to the data transfer unit, whereby the process parameter configuration instructions cause the data transfer unit to configure the storage unit to store at least one value of at least one process parameter.

13. An information viewing system according to claim 10, wherein the at least one process parameter is a plurality of process parameters and the information viewing system further comprises a plurality of first devices each having a first signal generator disposed therein that generates input signals including values of process parameters associated with the first device, wherein the data capture unit receives each of the input signals and the storage unit one of overwrites and appends a stored value of a process parameter with a value of the process parameter transmitted in the corresponding input signal by the associated first device.

14. An information viewing system according to claim 10, wherein the input signal includes information associated with the at least one process parameter and the storage unit one of overwrites and appends a stored value of the associated information stored therein with the value of the associated information in the input signal.

15. An information viewing system according to claim 10, wherein the first communicator is configured to deliver the input signal to a plurality of devices using the scheduled periodic communications.

16. An information viewing system according to claim 10, further comprising a plurality of third devices each having a second signal generator disposed therein that generates request signals requesting values of one or more of the at least one process parameter contained in the storage unit.

17. An information viewing system according to claim 10, wherein the third device is connected to the second device by a second bus of a second process control network wherein each of the devices is capable of communicating on the second bus using unscheduled periodic communications.

18. A viewing process function module capable of being implemented in a process control device and of being used in a process control network having a plurality of devices communicatively coupled to a bus, wherein each of the devices includes at least one process function module capable of performing an input function, an output function, or a control function within the process control network and capable of communicating on the bus using scheduled and unscheduled periodic communications, the viewing process function module comprising:

a data capture unit that receives input signals, wherein each input signal is generated by one of the process function modules, contains a value of a process parameter associated with the process function module, and is transmitted using the scheduled periodic communications;

a storage unit that stores at least one value of at least one process parameter without using the at least one value to perform process control;

a data transfer unit that causes the values of the process parameters in the input signals to be stored in the storage unit;

an output host interface that receives request signals containing requests for at least one stored value of one or more of the at least one process parameter requested by a user from a plurality of selectable process parameters, the request signals generated by at least one of the devices and transmitted using the unscheduled queued communications,wherein the output host interface transfers the request signal to the data transfer unit;

wherein the data transfer unit retrieves the at least one stored value of the at least one process parameter from the storage unit and transfers the at least one stored value to the output host interface in response to each request signal; and wherein the output host interface generates a response signal containing the at least one stored value of the one or more of the at least one process parameter and transmits the response signal to the second one of the devices using the unscheduled queued communications in response to each request signal.

19. A viewing process function module according to claim 18, wherein the data capture unit receives a plurality of input signals containing values of a plurality of process parameters, generated by a plurality of devices and transmitted using the scheduled periodic communications, wherein the storage unit stores at least one value of each of the plurality of process parameters, and wherein the request signals request at least one stored value of at least one of the plurality of process parameters.

20. A viewing process function module according to claim 18, wherein the input signals generated by the first one of the devices are sent to a plurality of devices using the scheduled periodic communications.

21. A viewing process function module according to claim 18, wherein the storage unit stores information associated with the at least one process parameter.

22. A viewing process function module according to claim 18, wherein the viewing process function module is a viewing function block in a Fieldbus protocol.

23. A viewing process function module according to claim 18, wherein the second one of the devices is the process control device in which the viewing process function module is implemented.

24. A viewing process function module capable of being implemented in a process control device and of being used in a process control network having a plurality of devices communicatively coupled to a bus, wherein each of the devices includes one or more process function modules capable of performing an input function, an output function, or a control function within the process control network and capable of communicating on the bus using scheduled periodic communications, the viewing process function module comprising:

a data capture unit that receives a plurality of input signals containing values of at least one process parameter, the input signals generated by a plurality of the process function modules in one or more devices and transmitted using the scheduled periodic communications;

a storage unit that stores at least one value of each of the at least one process parameter without using the at least one value to perform process control; and a data transfer unit that one of overwrites and appends the stored values of the at least one process parameter in the storage unit with the values of the at least one process parameter from the input signals.

25. A viewing process function module according to claim 24, wherein the input signals generated by the first one of the devices are sent to a plurality of devices using the scheduled periodic communications.

26. A viewing process function module according to claim 24, wherein the storage unit stores information associated with the at least one process parameter.

27. A viewing process function module according to claim 24, wherein the viewing process function module is a viewing function block in a Fieldbus protocol.

28. A viewing process function module according to claim 24, wherein each of the devices is capable of communicating on the bus using unscheduled queued communications, the viewing process function module further comprising:

an output host interface that receives request signals containing requests for at least one stored value of at least one process parameter requested by a user from a plurality of selectable process parameters, the request signals generated by at least one of the devices and sent using the unscheduled queued communications, and that transfers the request signals to the data transfer unit;

wherein the data transfer unit retrieves the at least one stored value of the at least one process parameter from the storage unit and transfers the at least one stored value to the output host interface; and wherein the output host interface generates response signals containing the at least one value of the at least one process parameter and transmits the response signals to the requesting devices using the unscheduled queued communications.

29. A method of viewing real time process information in a process control network having a plurality of devices communicatively linked on a bus, wherein each of the devices includes at least one process function module capable of performing a process control function within the process control network using process parameters and capable of communicating on the bus, and a viewing bus monitor communicatively linked on the bus capable of filtering process data out of transmissions on the bus, of storing values of process parameters, of being configured by a user to store at least one process parameter, and of retrieving values of the process parameters in response to a request generated by a user selecting the process parameters from a plurality of selectable process parameters, the method comprising the steps of:

configuring the viewing bus monitor to store at least one value of at least one process parameter, each of the at least one process parameter being associated with one of the process function modules;

transmitting a process data message containing a value of the at least one process parameter onto the bus;

capturing transactions on the bus at the viewing bus monitor;

identifying the process data message containing the value of the at least one process parameter at the viewing bus monitor; and storing the value of the at least one process parameter in the viewing bus monitor.

30. A method of viewing real time process information in a process control network according to claim 29, wherein the at least one process parameter is a plurality of process parameters.

31. A method of viewing real time process information in a process control network according to claim 29, further comprising the steps of:

configuring the viewing bus monitor to store information associated with the at least one process parameter; and transmitting the associated information in the process data message with the value of the at least one process parameter.

32. A method of viewing real time process information in a process control network according to claim 29, wherein the viewing bus monitor includes a human interface and the method further comprises the steps of:

entering a request for at least one stored value of the at least one process parameter at the human interface;

retrieving the at least one stored value of the at least one process parameter from the viewing bus monitor; and displaying the at least one stored value of the at least one process parameter from the viewing bus monitor at the human interface.

33. A method of viewing real time process information in a process control network according to claim 29, further comprising the steps of:

connecting a human interface to the first device;

entering a request for at least one stored value of the at least one process parameter at the human interface;

retrieving the at least one stored value of the at least one process parameter from the storage unit; and displaying the at least one stored value of the at least one process parameter from the storage unit at the human interface.

34. An information viewing system for viewing real time values of process parameters in a process control network having a plurality of devices communicatively linked over a bus, wherein each of the devices is capable of performing a process function and of communicating on the bus, the information viewing system comprising:

a first signal generator disposed in a first device that generates process data messages including values of at least one process parameter;

a first communicator coupled to the first signal generator and configured to transmit the process data messages on the bus;

a data capture unit disposed in a viewing bus monitor that identifies the process data messages, wherein the viewing bus monitor is capable of capturing all transactions on the bus;

a storage unit disposed in the viewing bus monitor and communicatively linked to the data capture unit, the storage unit adapted to store at least one value of at least one process parameter without using the value to perform process control;

a human interface that generates requests for at least one value of the at least one process parameter contained in the storage unit, wherein the requests are generated by a user selecting the at least one process parameter from a plurality of selectable process parameters;

wherein the at least one value of the at least one process parameter is retrieved from the storage unit and displayed at the human interface.

35. An information viewing system according to claim 34, further comprising a data transfer unit disposed in the viewing bus monitor and communicatively linked to the data capture unit and the storage unit, wherein the data transfer unit is adapted to receive the value of the at least one process parameter from the data capture unit and to cause the storage unit to one of overwrite and append the stored value of the at least one process parameter with the value of the at least one process parameter transmitted in the corresponding process data message.

36. An information viewing system according to claim 35, wherein the data transfer unit is adapted to configure the storage unit to store one value of at least one process parameter, and the human interface is communicatively linked to the data transfer unit and adapted to transfer a process parameter configuration instruction to the data transfer unit, whereby the process parameter configuration instruction causes the data transfer unit to configure the storage unit to store at least one value of the at least one process parameter.

37. An information viewing system according to claim 34, wherein the human interface is disposed within the viewing bus monitor.

38. An information viewing system according to claim 34, wherein the at least one process parameter is a plurality of process parameters and the information viewing system further comprises a plurality of first devices each having a first signal generator disposed therein that generates process data messages including values of a process parameter associated with the first device, wherein the data capture unit captures each of the process data messages and the storage unit one of overwrites and appends a stored value of a process parameter with the value of the process parameter transmitted in the corresponding process data message by the associated first device.

39. An information viewing system according to claim 34, wherein the process data message includes information associated with the process parameter and the storage unit overwrites a stored value of the associated information stored therein with the value of the associated information in the process data message.

40. A viewing bus monitor capable of being used in a process control network having a plurality of devices communicatively coupled to a bus, wherein each of the devices includes at least one process function module capable of performing an input function, an output function, or a control function within the process control network and capable of communicating on the bus, and wherein a human interface is communicatively linked to the viewing bus monitor, the viewing bus monitor comprising:

a data capture unit adapted to capture all transactions on the bus and identify process data messages containing values of process parameters to be monitored by the viewing bus monitor, the process data messages generated by at least one of the devices and transmitted on the bus;

a storage unit configured to store at least one value of at least one process parameter without using the at least one value to perform process control;

a data transfer unit that causes the values of the at least one process parameter to be stored in the storage unit;

wherein the data transfer unit receives requests for at least one stored value of the at least one process parameter from the human interface; and wherein the data transfer unit retrieves the at least one stored value of the at least one process parameter from the storage unit and transfers the at least one stored value to the human interface for display in response to the request.

41. A viewing bus monitor according to claim 40, wherein the data capture unit receives a plurality of process data messages containing values of a plurality of process parameters generated by a plurality of devices and transmitted on the bus, wherein the storage unit stores at least one value of each of the plurality of process parameters, and wherein each request may contain a request for at least one stored value of at least one of the plurality of process parameters.

42. A viewing bus monitor according to claim 40, wherein the storage unit stores information associated with the at least one process parameter.

43. A viewing bus monitor according to claim 40, wherein the human interface is disposed within the viewing bus monitor.

44. A viewing bus monitor according to claim 40, wherein the at least one process parameter is a plurality of process parameters.

* * * * *